(12) United States Patent
James et al.

(10) Patent No.: US 9,912,994 B2
(45) Date of Patent: Mar. 6, 2018

(54) INTERACTIVE DISTRIBUTED MULTIMEDIA SYSTEM

(71) Applicant: MOBILEDIRECT, INC., Missoula, MT (US)

(72) Inventors: Paul Daniel James, Queen Creek, AZ (US); Arthur Milliken, Berkeley, CA (US); Robert Perry Hooker, Bozeman, MT (US); Clyde W. Neu, Missoula, MT (US)

(73) Assignee: MOBILEDIRECT, INC., Missoula, MT (US)

( * ) Notice: Subject to any disclaimer, the term of this patent is extended or adjusted under 35 U.S.C. 154(b) by 0 days.

(21) Appl. No.: 15/321,670

(22) PCT Filed: Jul. 1, 2015

(86) PCT No.: PCT/US2015/038886
§ 371 (c)(1),
(2) Date: Dec. 22, 2016

(87) PCT Pub. No.: WO2016/004240
PCT Pub. Date: Jan. 7, 2016

(65) Prior Publication Data
US 2017/0251261 A1    Aug. 31, 2017

Related U.S. Application Data

(60) Provisional application No. 62/020,753, filed on Jul. 3, 2014.

(51) Int. Cl.
*H04N 7/10* (2006.01)
*H04N 7/025* (2006.01)
(Continued)

(52) U.S. Cl.
CPC ..... *H04N 21/4725* (2013.01); *H04N 21/2347* (2013.01); *H04N 21/2393* (2013.01); *H04N 21/8583* (2013.01)

(58) Field of Classification Search
CPC .......... H04N 21/4725; H04N 21/2347; H04N 21/2393; H04N 21/8583
See application file for complete search history.

(56) References Cited

U.S. PATENT DOCUMENTS 7,409,144 B2 * 8/2008 McGrath ........... G06F 17/30784
348/222.1
7,606,255 B2 10/2009 Smith
(Continued)

FOREIGN PATENT DOCUMENTS

WO    2013188290 A2    12/2013
WO    2016004240 A1    1/2016

OTHER PUBLICATIONS

International Search Report and Written Opinion received for PCT/US2015/038886 dated Oct. 15, 2015.

*Primary Examiner* — Oleg Asanbayev
(74) *Attorney, Agent, or Firm* — Dorsey & Whitney LLP

(57) ABSTRACT

Systems and methods for providing an interactive multimedia experience are described. For example, a method for providing interactive content includes receiving content data, receiving an indication of a region within a frame of the content data, receiving a scripting event associated with the region, wherein the scripting event specifies an action to be taken responsive to a trigger, receiving a metadata tag or a reference to the metadata tag, the metadata tag associated with the region, and formatting at least a portion of the content data, the indication of the region, the scripting event, and the metadata tag or the reference to the metadata tag in accordance with a file format for transmission.

10 Claims, 15 Drawing Sheets

(51) Int. Cl.
*H04N 21/4725* (2011.01)
*H04N 21/239* (2011.01)
*H04N 21/858* (2011.01)
*H04N 21/2347* (2011.01)

(56) References Cited

U.S. PATENT DOCUMENTS

| | | |
|---|---|---|
| 8,786,593 B2 | 7/2014 | Joung et al. |
| 2012/0094768 A1 | 4/2012 | McCaddon et al. |
| 2012/0315011 A1* | 12/2012 | Messmer .......... H04N 21/8358 386/230 |
| 2013/0104015 A1* | 4/2013 | Nonaka ................ G06F 17/212 715/204 |
| 2013/0104016 A1* | 4/2013 | Nonaka ................ G06F 17/00 715/204 |
| 2013/0132861 A1 | 5/2013 | Kienzle et al. |
| 2013/0223539 A1* | 8/2013 | Lee ...................... H04L 65/607 375/240.25 |
| 2013/0227622 A1 | 8/2013 | Landow et al. |
| 2013/0326341 A1* | 12/2013 | Nonaka ................ G06T 11/60 715/246 |
| 2014/0149867 A1 | 5/2014 | McCaddon et al. |
| 2014/0314394 A1 | 10/2014 | Trautman et al. |
| 2016/0088281 A1* | 3/2016 | Newton ................ H04N 19/17 348/43 |

\* cited by examiner

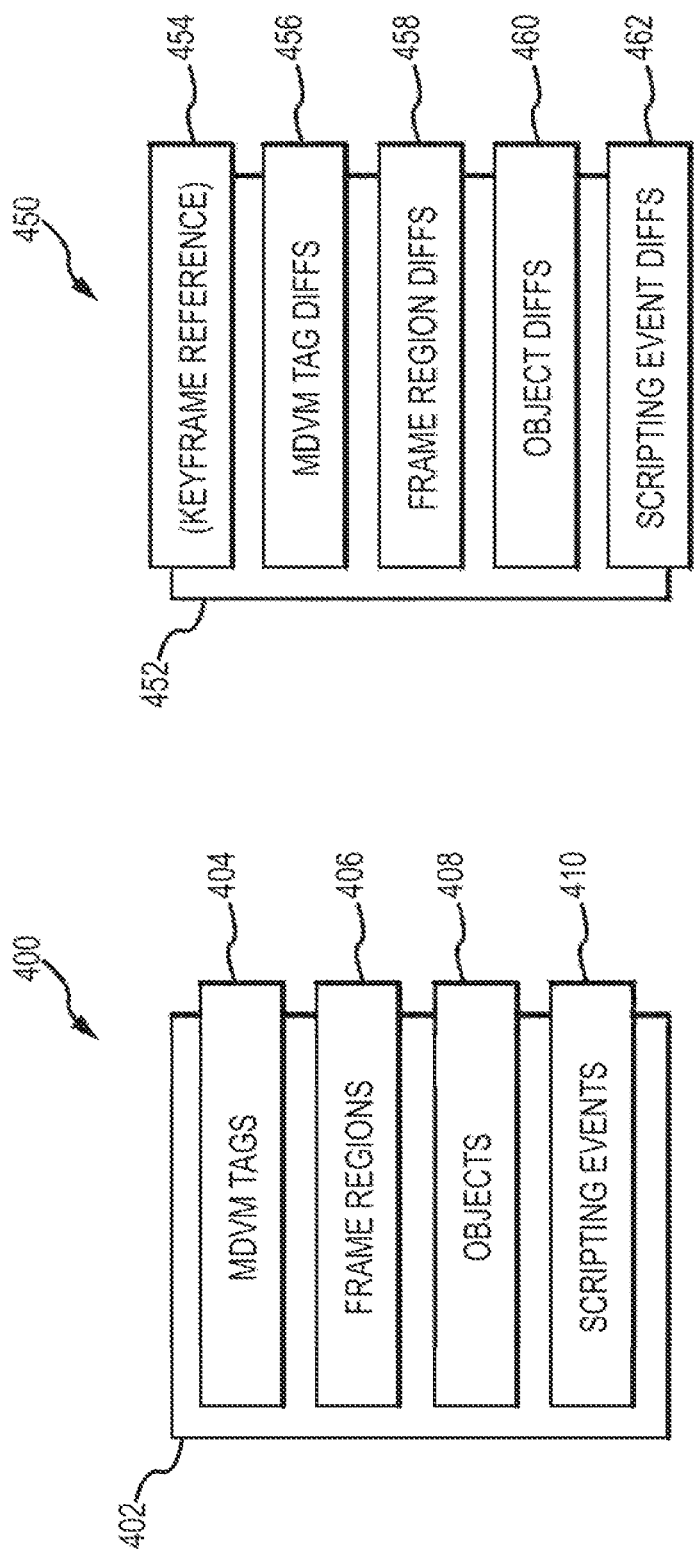

INTERACTIVE DISTRIBUTED MULTIMEDIA SYSTEM

CROSS-REFERENCE

This application is a U.S. National Stage filing under 35 U.S.C. § 371 of PCT Application No. PCT/US2015/038886, filed Jul. 1, 2015, entitled "INTERACTIVE DISTROBUTED MULTIMEDIA SYSTEM", which claims priority to U.S. Provisional Application No. 62/020,753 filed Jul. 3, 2014, entitled "INTERACTIVE DISTRIBUTED MULTIMEDIA SYSTEM" which applications are incorporated herein by reference, in their entirety, for any purpose.

FIELD

This disclosure relates generally to systems and methods for distributing and consuming interactive multimedia content over a distributed computer network, including a data exchange format used for real-time and on-demand streaming of multimedia content allowing for real-time interaction between the client application/end-user and the content itself.

BACKGROUND

Multimedia distribution and consumption has a long history in the art. Numerous file formats, multimedia players, and even dedicated multimedia content providers exist. Common examples include file formats such as MPEG-4 (MP4), QuickTime (MOV), Audio-Video Interleave (AVI), Windows Media Video (WMV), and Shockwave/Flash (SWF) among many others. Common multimedia players include Windows Media Player, QuickTime, RealPlayer, WinAmp, and many others. Dedicated content providers include YouTube, Vimeo, Hulu, and many others.

Unfortunately, traditional multimedia is not constructed to support interactions beyond simple playback controls. There exists no way in which to allow a video producer, for example, to identify the items (such as the clothing worn by an actor) available for sale within the video, nor is there a way for the products to be purchased as the video plays. Similarly, there is no possibility with existing technologies to provide additional actions and annotations to video during playback.

Certainly, some technologies such as Adobe's Extensible Media Platform (XMP) allow detailed metadata to be bundled with multimedia files, but XMP does not allow temporal compression, scripted events, nor streaming delivery of metadata. Similarly, some systems such as YouTube allow some limited capabilities for annotating some interactive areas of videos with text or for redirection to a Uniform Resource Locator (URL) and some social commenting on a video stream, but no file and player system includes a full capability suite for interaction, annotation, scripting, temporal compression, and streaming.

SUMMARY

A method for providing interactive content includes receiving content data, receiving an indication of a region within a frame of the content data, receiving a scripting event associated with the region, wherein the scripting event specifies an action to be taken responsive to a trigger, receiving a metadata tag or a reference to the metadata tag, the metadata tag associated with the region, and formatting at least a portion of the content data, the indication of the region, the scripting event, and the metadata tag or the reference to the metadata tag in accordance with a file format for transmission. In some examples, the trigger comprises a system event or a user interaction with the region.

According to some examples, the content data comprises video data, and the formatting at least a portion of the content data, the indication of the region, and the scripting event comprises encoding a video data block and a metadata block associated with the frame into a digital container, the metadata block comprising a metadata tag associated with the scripting event and a definition of an action to be performed responsive to execution of the scripting event. According to some examples, the digital container comprises a plurality of information tracks including a first track comprising the video data block and a second track comprising the metadata block. According to some examples, the digital container further comprises one or more additional tracks comprising audio data, the method further comprising formatting at least a portion of the audio data in accordance with the file format. According to further examples, the digital container comprises keyframe header data, video frame difference data blocks and metadata frame difference blocks associated with respective ones of the video frame difference data blocks.

In some examples, the frame is one of a plurality of frames and the method further comprises formatting a plurality of data blocks associated with the plurality of frames and associated metadata into a stream container for transmission in the form of streamed video. In some examples, the method further comprises encrypting at least a portion of the metadata block prior to encoding the metadata block into the digital container. In some examples, the region corresponds to a three dimensional object in the frame, and receiving an indication of a region within a frame comprises automatically detecting the object within the frame. In some examples, the method further comprises selecting the action to be taken responsive to the trigger from a library of available action, and associating the selected action with the scripting event and the metadata tag.

A system for providing interactive content comprises a processor, and a memory having instructions, which when executed by the processor, cause the system to receive video data, receive an indication of a region within a frame of the video data, associate a scripting event with the region, wherein the scripting event specifies an action to be taken responsive to a trigger, associate a metadata tag with the region, and format at least a portion of the content data, the indication of the region, the scripting event, and the metadata tag in accordance with a file format for transmission. In some examples, the trigger comprises a system event or a user interaction with the region.

In some examples, the processor is communicatively coupled to a database comprising a plurality of tags and a plurality of scripting events, the memory having further instructions to cause the system to receive an indication of a selection of one or more tags from the plurality of tags in the data storage, receive an indication of a selection of one or more scripting events from the plurality of scripting events in the data storage, and associate the one or more scripting events with the one or more tags and the region within the frame. In some example, the system further comprises instructions, which when executed by the processor, cause the system to encrypt at least a portion of the metadata block prior to encoding the metadata block into the digital container. In further examples, the system comprises instructions, which when executed by the processor, cause the system to receive a selection of the action to be performed responsive to user interaction with the regions from a library of available action, and associate the selected action with the scripting event and the metadata tag.

In some examples, the content data comprises video data. In some examples, the frame is one of a plurality of frames, and the system further comprises instructions, which when executed by the processor, cause the system to format a plurality of data blocks associated with the plurality of frames and associated metadata into a stream container for transmission in the form of streamed video. In further examples, the region corresponds to a three dimensional object in the frame, and wherein the receiving an indication of a region within a frame comprises automatically detecting the object within the frame.

In some examples, wherein the content data comprises video data, the instructions to format at least a portion of the content data, the indication of the region, the metadata tag, and the scripting event in accordance with a file format comprise instructions, which when executed by the processor, cause the system to encode a video data block and a metadata block associated with the frame into a digital container, the metadata block comprising the metadata tag or a reference to the metadata tag and a definition of an action to be performed responsive to execution of the scripting event. According to some examples, the digital container comprises a plurality of information tracks including a first track comprising the video data block and a second track comprising the metadata block. According to some examples, the first track comprises keyframe data and video frame difference data blocks and wherein the second track comprises keyframe metadata and metadata frame difference blocks associated with respective ones of the video frame difference data blocks. According to further examples, the digital container further comprises one or more additional tracks comprising audio data, the method further comprising formatting at least a portion of the audio data in accordance with the file format.

A computer readable medium according to some examples herein comprises processor-executable instructions for receiving content data, receiving an indication of a region within a frame of the content data, receiving a scripting event associated with the region, wherein the scripting event specifies an action to be taken responsive to a trigger, receive a metadata tag or a reference to the metadata tag, the metadata tag associated with the region, and formatting at least a portion of the content data, the indication of the region, the scripting event, and the metadata tag or the reference to the metadata tag in accordance with a file format for transmission. In some examples, the trigger comprises a system event or a user interaction with the region.

In some examples, wherein the content data comprises video data, the processor-executable instructions for formatting at least a portion of the content data, the indication of the region, the scripting event, and the metadata tag or the reference to the metadata tag comprise instructions for encoding a video data block and a metadata block associated with the frame into a digital container, the metadata block comprising the metadata tag or the reference to the metadata tag and a definition of an action to be performed responsive to execution of the scripting event. In further examples, the computer readable medium comprises instructions for encrypting at least a portion of the metadata block prior to encoding the metadata block into the digital container. In some examples, the video data comprises a plurality of frames and the computer readable medium further comprises instructions for formatting a plurality of data blocks associated with the plurality of frames and associated metadata into a stream container for transmission in the form of streamed video. In further examples, wherein the region corresponds to a three dimensional object in the frame, the processor-executable instructions for receiving an indication of a region within a frame comprises instructions for automatically detecting the object within the frame. In yet further examples, the computer readable medium comprises instructions for selecting the action to be performed responsive to user interaction with the regions from a library of available actions, and associating the selected action with the scripting event and the metadata tag.

A method for playback of interactive content according to some examples herein includes receiving a file or stream comprising content data including video data, audio data, or combinations thereof, receiving a file or stream comprising metadata, the metadata comprising metadata tags associated with one or more regions of one or more frames of the content data, decoding the content data, decoding the metadata using a metadata decoder, receiving an indication of a trigger comprising a system event or a user interaction with the region, and executing the scripting event responsive to receipt of the indication of the trigger. In some examples, receiving a file or stream comprising content data and receiving a file or stream comprising metadata includes receiving a file or stream comprising a plurality of tracks including a first track comprising the content data and a second track comprising the metadata. In some examples, wherein the first track comprises video data, the file or stream further comprises one or more additional tracks comprising audio data and the method further comprising decoding the audio data with an audio decoder. In some examples, the method further comprises decrypting at least a portion of the metadata prior to receiving the indication of the trigger.

In some examples, wherein the content data comprises video data, and wherein the region is associated with a first set of coordinates in the frame, the method further comprises tracking a change of the region between successive frames of the video data, including determining a second set of coordinates in the frame corresponding to the region in a subsequent frame. In some examples, wherein trigger comprises a user interaction responsive to a selection of the region with a cursor controller, the method further comprises receiving an indication of a captured content item responsive to the selection of the region. In some examples, the method further comprises displaying a visual cue responsive to receiving the indication of the captured content item without interruption to a displaying of the content data. In further examples, the method comprises displaying a listing of captured content items following termination of displaying of the video data, receiving a selection of a captured content item from the listing, and launching an application responsive to the selection of the captured content item.

A system for playback of interactive video data includes a processor, and a memory having instructions, which when executed by the processor, cause the system to receive a file or stream comprising content data including video data, audio data, or combinations thereof, receive a file or stream comprising metadata, the metadata comprising at least one of a scripting event and one or more metadata tags associated with a region within a frame of the content data, decode the content data, decode the metadata using a metadata decoder, receive an indication of a trigger comprising a system event or a user interaction with the region of the frame, and execute the scripting event responsive to receipt of the indication of the trigger. In some examples, wherein the file or stream comprises a plurality of tracks including a first track comprising video data and a second track comprising the metadata, and wherein the file or stream further comprises one or more additional tracks comprising audio data, the system further comprising instruction for decoding the audio data with an audio decoder. In some examples, wherein the metadata is encrypted, the system further comprising instructions for decrypting at least a portion of the metadata prior to receiving the indication of the trigger. In some examples, wherein the region is associated with a first set of coordinates in the frame, the system further comprising instructions for tracking a change of the region between successive frames of the video data, including instructions for determining a second set of coordinates in the frame corresponding to the region in a subsequent frame. In some examples, wherein the trigger comprises a user interaction responsive to a selection of the region with a cursor controller, the system further comprising instructions for receiving an indication of a captured content item responsive to the selection of the region. In some examples, the system further comprises instructions for displaying a visual cue responsive to receiving the indication of the captured content item without interruption to a displaying of the video data. In some examples, the system further comprises instructions for displaying a listing of captured content items following termination of displaying of the video data, receiving a selection of a captured content item from the listing, and launching an application responsive to the selection of the captured content item.

A computer readable medium comprises processor-executable instructions for receiving a file or stream comprising content data including video data, audio data, or combinations thereof, receiving a file or stream comprising metadata, the metadata comprising at least one of a scripting event and one or more metadata tags associated with a region within a frame of the content data, decoding the content data, decoding the metadata using a metadata decoder, receiving an indication of a trigger comprising a system event or a user interaction with the region of the frame, and executing the scripting event responsive to receipt of the indication of the trigger. In some examples, wherein the file or stream comprises a plurality of tracks including a first track comprising video data and a second track comprising the metadata, and wherein the file or stream further comprises one or more additional tracks comprising audio data, the computer readable medium further comprising instruction for decoding the audio data with an audio decoder. In some examples, the computer readable further comprises instructions for decrypting at least a portion of the metadata prior to receiving the indication of the trigger. In some examples, wherein the region is associated with a first set of coordinates in the frame, the computer readable medium further comprises instructions for tracking a change of the region between successive frames of the video data, including instructions for determining a second set of coordinates in the frame corresponding to the region in a subsequent frame. In some examples, wherein the trigger comprises a user interaction responsive to a selection of the region with a cursor controller, the computer readable medium further comprises instructions for receiving an indication of a captured content item responsive to the selection of the region. In some examples, the computer readable medium further comprises instructions for displaying a visual cue responsive to receiving the indication of the captured content item without interruption to a displaying of the video data. In some examples, the computer readable medium further comprises instructions for displaying a listing of captured content items following termination of displaying of the video data, receiving a selection of a captured content item from the listing, and launching an application responsive to the selection of the captured content item.

BRIEF DESCRIPTION OF THE DRAWINGS

FIG. 4b is a block diagram of an example metadata block structure within a file format according to some examples of the present disclosure.

FIG. 4c is a block diagram of an example metadata block difference (diff) structure within a file format according to some examples of the present disclosure.

DETAILED DESCRIPTION

Figure 1:
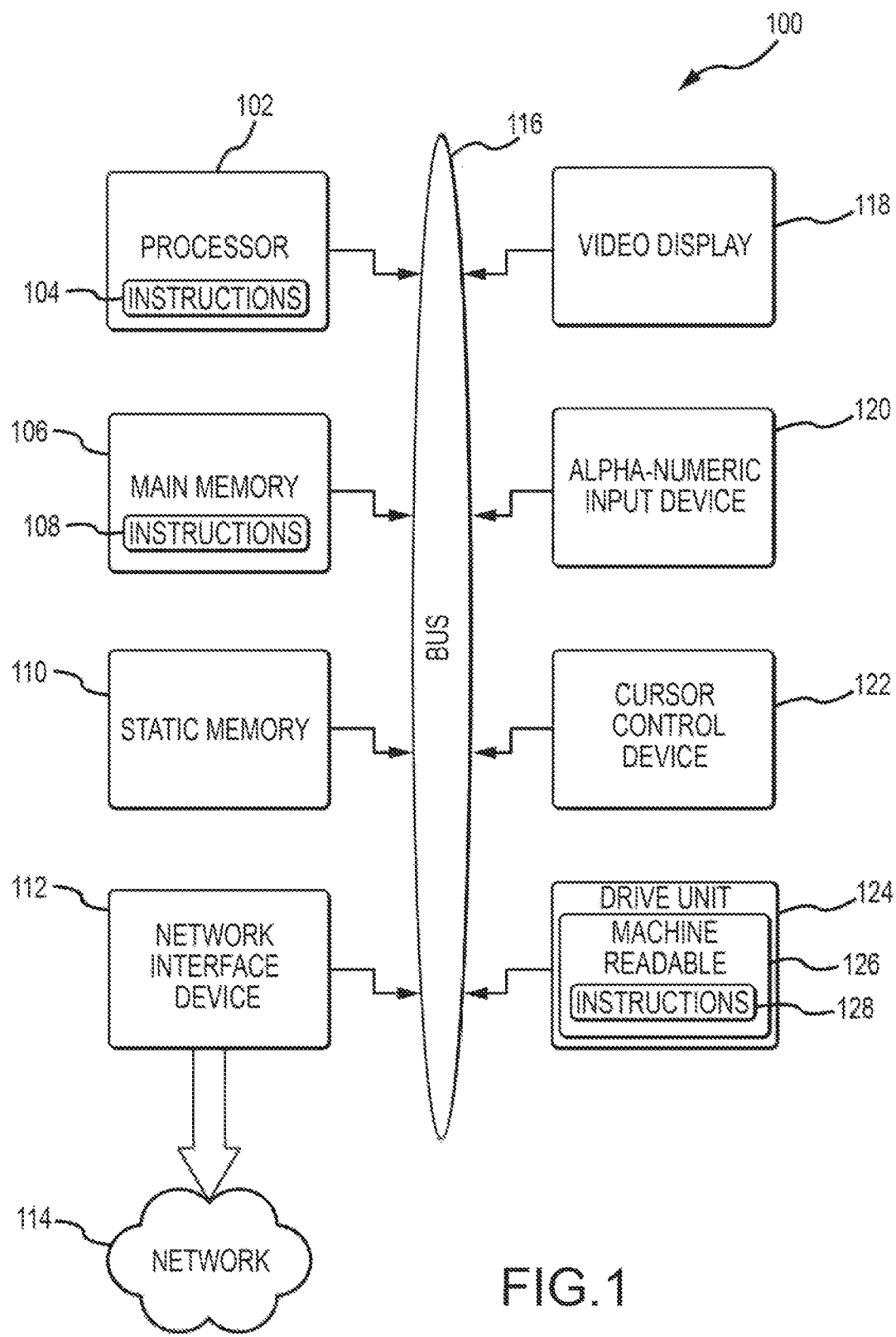
FIG. 1 is a block diagram of an example computing system upon which examples of software described herein can execute.

In the following detailed description of example embodiments, reference is made to the accompanying drawings that form a part hereof, and in which is shown by way of illustration specific example embodiments in which the subject matter may be practiced. These embodiments are described in sufficient detail to enable those skilled in the art to practice the subject matter, and it is to be understood that other embodiments may be utilized and that logical, mechanical, electrical, software and other changes may be made without departing from the scope.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. Also, please note that the first digit(s) of the reference number for a given item or part of the example embodiments should correspond to the Figure number in which the item or part is first identified.

The description of the various embodiments is to be construed as exemplary only and does not describe every possible instance of the subject matter. Numerous alternatives can be implemented, using combinations of current or future technologies, which would still fall within the scope of the claims. The following detailed description is, therefore, not to be taken in a limiting sense, and the scope of the covered subject matter is defined only by the appended claims.

For illustrative purposes, various embodiments may be discussed below with reference to a MOBILEDIRECT System. The most common example discussed in detail is an interactive video player using an interactive video content format called MDV. In the context of the present disclosure the term MOBILEDIRECT Video may be abbreviated as MDV, e.g., when referring to MDV file or MDV player, and the term MOBILEDIRECT Video Metadata may be abbreviated as MDVM, e.g., when referring to MDVM file or MDVM tag. The MOBILEDIRECT System may generally be implemented using any film, video feature or television programming that can be viewed via a suitably configured video player installed on desktop and/or mobile devices or on any hosting appliance that supports continuously streaming television/video transmissions. This is only one example of a suitable environment and is not intended to suggest any limitation as to the scope of use or functionality of the subject matter. Neither should it be interpreted as having any dependency or requirement relating to any one or a combination of components illustrated in the example operating environments described herein.

In general, various embodiments combine, in an interactive video system, the opportunity to play interactive videos using an interactive video content format. Thus some embodiments discuss interactive viewing, while others may discuss the content format or specific applications of interactive video. Further, some embodiments may incorporate video codecs, transcoders, editing suites, live streaming tools, or other related capabilities.

In the specifics of discussing interactive video, a variety of terms will be used in the specification. "File format" or "content format" may be used to refer to any description relating to the particular encoding of video or other information for transmission, storage, and/or retrieval. For example, a file format may include or have the capacity to encode interactive elements as well as standard video and audio information. "Tags" is generally used to refer to modular pieces of metadata which can be used by an interactive video player while the interactive video content plays. For example, a tag may include (a) publication data (e.g. identifier, name, publication & expiration date, bundles, and the like), (b) properties (e.g. an arbitrary list of attributes, listed in key/value pairs, including nested properties), and (c) bundles (e.g. a specific subset of properties). In other examples, other subsets or combinations of those attributes (a) (b), and/or (c) may be included in a tag. In some examples, a tag may only include one of those types of information. "Codec" generally refers to a system which can encode or decode a digital data stream or signal. For example, a codec may include or have the capacity to encode or decode streaming media and allow mid-stream access, e.g. using keyframes in the data. "Transcoders" generally refer to any tools which can convert content from one file format to a different format. For example, when transcoding by converting out of an interactive file format such as MDV into a non-interactive format, interactive-specific information may be lost. Similarly, when transcoding by converting into an interactive file format such as MDV, no interactive information may be available since it was absent in the original format (e.g., MP4). A "player" generally refers to any system which can interpret a content format and present it properly for a human consumer. Players commonly have standard controls such as "play", "fast forward", "rewind", "pause", and "stop", but may include fewer, additional, or other capabilities. For example, for interactive video content a player may have access to additional information or actions such as displaying external content (e.g. products for purchase), descriptive information, and/or functional scripts. "Editing tools" or "editing suite" generally refer to a set of tools for adding metadata and scripting to multimedia files. Editing may include modification of the video, detecting or describing regions of content (e.g. facial recognition or interactive regions), adding referential links to content, product purchase actions, product catalogs, order fulfillment, content management, or combinations thereof. "Streaming" generally refers to multimedia that is received by and presented to an end-user while being delivered by a provider. "Streaming" may refer to a live broadcast or the simultaneous delivery and display of content from a remote source, for example. The streaming may be continuous or may, in some examples, be periodic, or have breaks in the continuity. In the context of interactive video, streaming may include the capability to interact with streaming editing tools to incorporate and automate, using machine vision algorithms and machine learning algorithms, e.g. face detection, object or pattern detection and/or tracking, scene recognition, static or dynamic region discovery, geolocation, manual tagging, automatic tagging, social tagging, scripting, and/or other activities described herein. Said capabilities can occur in real-time and utilize a variety of hardware and algorithmic techniques in some examples, including hardware sensor detection (e.g. Radio Frequency Identification, iBeacon, etc.), manual annotation, annotation middleware, and annotation software embedded in hardware (e.g. a video camera).

In some examples, annotation of content, e.g., to provide an interactive user experience, may occur on the front-end of content production, by video/audio content producers. In further examples, annotation of content may occur at a later stage, e.g., in cases where pre-existing or original content is used. In some instances, certain content may only be available to a user as interactive content (e.g., MDV file) which may only be made available to users as hosted content on a MOBILEDIRECT server. For example, such content may only be available through authorized access by a user of an MDV player, which may be hosted on the MOBILEDIRECT server and/or may retrieve interactive content for playback from the MOBILEDIRECT server.

The following examples are provided to illustrate the operation of systems and methods described herein. Where applicable, references are made to figures as described and figure element indicators are used to indicate specific figure elements. While the various examples may be presented as an interconnected narrative, the interconnection may not be necessary or expected as an aspect of the described subject matter. It is to be understood that not all examples may utilize all functions or have all (or even any) advantages described herein. In the examples below, references to "MOBILEDIRECT Video (MDV)" generally refer to a system incorporating embodiments of the described subject matter.

Example systems and methods may provide a new streaming multimedia system supporting uninterrupted, interactive engagement with scripted content by users which may facilitate e-commerce transactions over the Internet incorporating big data analytics to render the engagement highly efficient and effective in some examples.

Example video players described herein may allow users to browse content from a variety of different sources, view that content and interact with it by touching (or otherwise selecting) interactive regions within the content. Whenever an interactive region is touched (or otherwise selected), a visual cue may let the user know they've "captured" that content. When done viewing the content, users can browse their virtual "cart" for all of their "captured" content. Each item contains a "call to action" that is appropriate to the context of that particular item. In some cases, this call to action lets the user purchase that item from the supplier's own web site or shopping app. In other cases, this call to action directs the user to a web site or app that allows them to learn more about that item. In still other cases, the call to action may direct the user to view more MOBILEDIRECT hosted content, or even to launch another app for another user experience.

Additionally, examples of MOBILEDIRECT video described herein may contain the ability to share that video link to anyone within that user's social network, e.g. via FACEBOOK, GOOGLE+, TWITTER, LINKEDIN, etc., or to anyone in the user's contact list. The shared link will track "who" shared that link in addition to the link itself, so that the "sharer" can get credit for any commerce that resulted from that share.

Systems and methods to create an interactive multimedia experience are described which may utilize both a custom file format and associated viewing and editing capabilities. The systems and methods may allow creation of new content for both download and streaming, as well as repurposing of existing content into interactive content. Described herein is a system and method to create interactive multimedia content via a specific data file format, interactive player allowing integration with external systems, and annotation capabilities to manipulate the multimedia content.

EXAMPLES

FIG. 1 is a block diagram of an example embodiment of a computer system 100 upon which may be used to implement examples described herein (e.g. may be programmed with software described herein). The description of FIG. 1 is intended to provide a brief, general description of suitable computer hardware and a suitable computing environment in conjunction with which the embodiments may be implemented. In some embodiments, the embodiments are described in the general context of computer-executable instructions, such as program modules, being executed by a computer. Generally, program modules may include routines, programs, objects, components, data structures, etc., that perform particular tasks or implement particular data types.

The system as disclosed herein can be spread across many physical hosts. Therefore, many systems and sub-systems of FIG. 1 can be involved in implementing examples described herein.

Moreover, those skilled in the art will appreciate that the embodiments may be practiced with other computer system configurations, including hand-held devices, multiprocessor systems, microprocessor-based or programmable consumer electronics, network PCs, minicomputers, mainframe computers, appliances, automobiles, and the like. The embodiments may also be practiced in distributed computer environments where tasks are performed by I/O remote processing devices that are linked through a communications network. In a distributed computing environment, program modules may be located in both local and remote memory storage devices.

In the embodiment shown in FIG. 1, a hardware and operating environment is provided that may be used to implement example servers and/or remote clients.

Figure 5A:
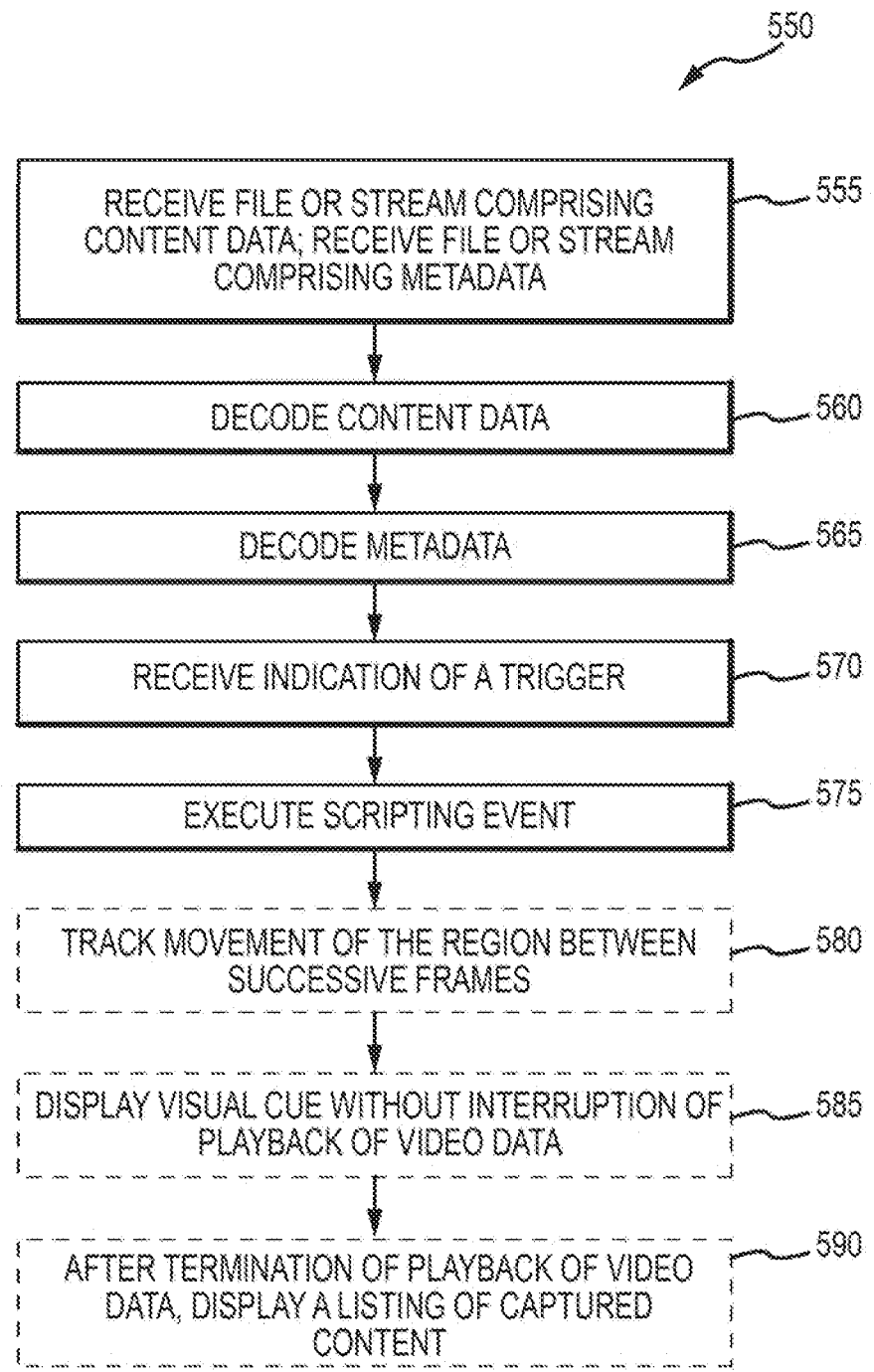
FIG. 5a is a flowchart of a method for playback of interactive content according to some examples of the present disclosure.

With reference to FIG. 1, an example embodiment extends to a machine in the example form of a computer system 100 within which instructions for causing the machine to perform any one or more of the methodologies discussed herein may be executed (e.g. the machine may be programmed to perform methods described herein, for example methods 150, 550 described further below with reference to FIGS. 2 and 5*a*). In some embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 100 may include one or more processing units, such as processor 102 (e.g., a central processing unit (CPU), a graphics processing unit (GPU) or both), a main memory 106 and a static memory 110, which communicate with each other via a bus 116. The computer system 100 may further include a video display unit 118 (e.g., a liquid crystal display (LCD) or a cathode ray tube (CRT)). In example embodiments, the computer system 100 also includes one or more of an alpha-numeric input device 120 (e.g., a keyboard), a user interface (UI) navigation device or cursor control device 122 (e.g., a mouse, a touch screen), a disk drive unit 124, a signal generation device (e.g., a speaker), and a network interface device 112.

The disk drive unit 124 includes a machine-readable medium 126 on which is stored one or more sets of instructions 128 and data structures (e.g., software instructions) embodying or used by any one or more of the methodologies or functions described herein. While the machine-readable medium 126 is shown as located on a disk drive unit 124, the medium may in other examples be resident on other memory or electronic storage, including the memory 106 and/or 110, for example. Generally, the medium including the instructions 128 may be in electronic communication with the processing unit, such as the processor 102, used to execute the instructions. Accordingly, the instructions 128 may also reside, completely or at least partially, within the main memory 108 or within the processor 104 during execution thereof by the computer system 100, the main memory 106 and the processor 102 also constituting machine-readable media.

While the machine-readable medium 126 is shown in an example embodiment to be a single medium, the term "machine-readable medium" may include a single medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of embodiments, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, e.g., media that is able to store information for a period of time, however brief. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 128 may further be transmitted or received over a communications network 114 using a transmission medium via the network interface device 112 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, wireless data networks (e.g., Wi-Fi and WiMAX networks), as well as any proprietary electronic communications systems that might be used. The term "transmission medium" shall be taken to include any intangible medium that is capable of storing, encoding, or carrying instructions for execution by the machine, and includes digital or analog communications signals or other intangible medium to facilitate communication of such software.

The example computer system 100, in the preferred embodiment, includes operation of the entire system on a remote server with interactions occurring from individual connections over the network 114 to handle user input as an internet application. As described herein the processor may be communicatively coupled to data storage (e.g., a database which may be implemented in a local or remote drive unit or other memory) for communicating therewith and/or retrieving data (e.g., computer executable instructions, content data including video data, audio data, or combinations thereof, and metadata including metadata tags, region definitions, scripting events, or combinations thereof) for performing one or more of the methods herein. In some examples, the processor may be communicatively coupled to the data storage (e.g., database) via a wired or wireless connection.

Figure 2:
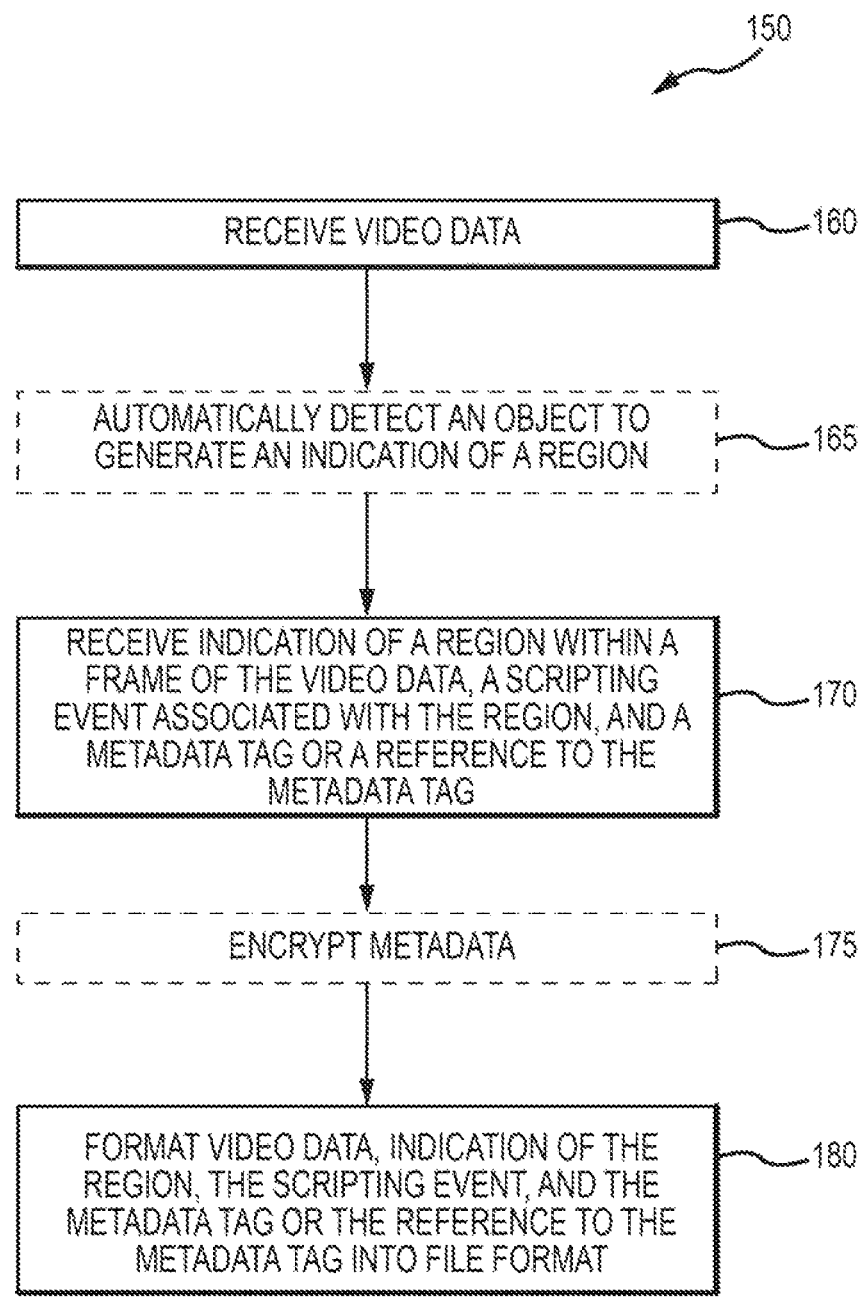
FIG. 2 is a flowchart of a method for providing interactive multimedia content according to some examples of the present disclosure.

According to some examples, a method for providing interactive multimedia content includes receiving content data (e.g., receiving video data as shown in box 160 of FIG. 2), receiving an indication of a region within a frame of the content data and receiving a scripting event associated with the region (e.g., as shown in box 170 of FIG. 2), wherein the scripting event specifies an action to be taken responsive to a trigger, and formatting at least a portion of the content data, the indication of the region, and the scripting event in accordance with a file format for transmission (e.g., as shown in box 180 of FIG. 2). In some examples, the trigger may be a system event. In some examples, the trigger may be a user interaction with the region.

As will be appreciated by the examples herein, the content data may include video data, audio data, or combinations thereof. Files or streams comprising interactive content according to the present disclosure may include a plurality of frames. One or more regions within one or more frames of the content data may be interactive regions. Metadata may be used to define interactive regions and scripting events associated with the regions. In some examples, and in embodiments in which the content data comprises video data, interactive regions (or simply regions) may be defined by specifying a set of coordinates corresponding to a spatial location within a visual representation of the frame of video data. In further examples, and as shown in box 165 in FIG. 2, the region may be defined by automatic detection of an object within the frame (e.g., with the use of an object recognition tool) as described further below with reference to FIG. 9.

According to some examples, the content data and associated metadata may be included in the same digital container, as described further below with reference to FIGS. 3a-3c. In some examples, the file format may include a plurality of tracks such as video and/or audio tracks and a metadata track comprising the metadata associated with the video and/or audio data. For examples, the file format may include a first track (e.g., a video track) and a second track (e.g., a metadata track). The video track may include keyframe video data and video frame difference data blocks and the metadata track may include keyframe metadata and metadata frame difference blocks associated with respective ones of the video frame difference data blocks. According to yet further examples, and as shown in box 175 in FIG. 2, the method may include encrypting at least a portion of one or more metadata blocks prior to encoding the metadata into a digital container for transmission as further discussed below with reference to FIG. 6a.

Figure 3A:
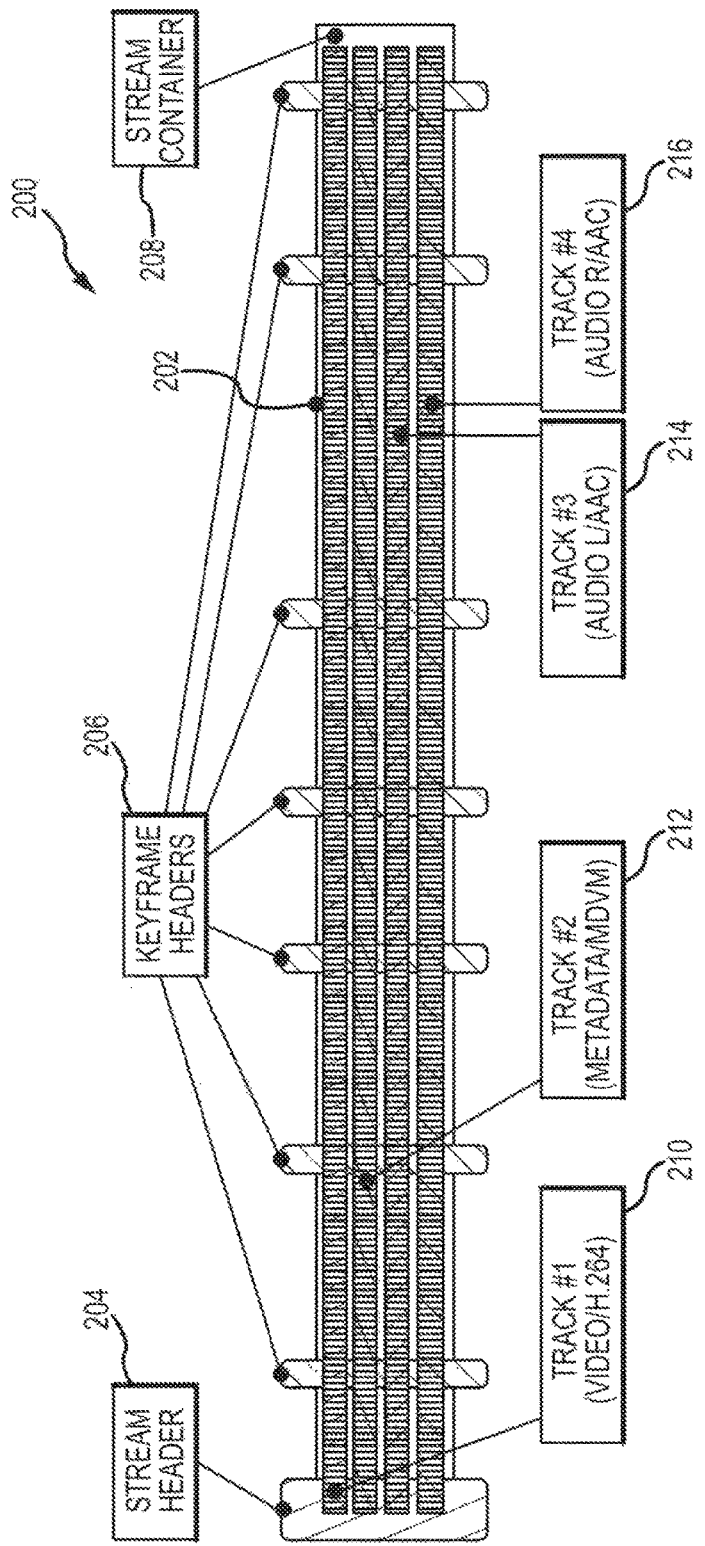
FIG. 3a is a block diagram of a conceptual view of an example embodiment of a file format according to the present disclosure.

FIG. 3a is a block diagram 200 of an example embodiment of a file format according to the present disclosure. The file format 202 may be a digital container format for interactive multimedia content. A multimedia file or stream formatted according to file format 202 shown in FIG. 3a may be referred to herein as an MDV file. It is to be understood that file formats described herein may be used for streaming content, pre-recorded, or stored content. Generally, a file may become a stream when it is read from storage media by a multimedia player. According to the example in FIG. 3a, interactive multimedia content may be formatted into a stream container 208. The stream container 208 may include specific beginning and ending information, or those elements may be inferred from the file context (e.g. location pointers, size information, etc.). Commonly the stream container 208 may begin with an optional stream header 204 which may contain basic information for how to interpret the file encoding, such as frame rates, number of tracks, audio and video encoding formats, etc. As is common with other multimedia file types, keyframe headers 206 may exist at points throughout the file. A keyframe-based file format includes periodic keyframe information which represent the full current information (e.g. still video frame) while those records between the keyframes contain only the elements that differ from the most recent keyframe. Thus, the keyframe headers 206 mark the location of complete current context information, whereas those data between keyframes are sequential difference indicators.

The stream container 208 may also include a plurality of tracks. In the example in FIG. 3a, stream container 208 includes four different information tracks 210, 212, 214, 216. The tracks 210, 212, 214, and 216 described herein refer to different components of a file and/or stream. The first track 210 may be a video track 210, which may be encoded using a specific encoding type such as H.264, a block-oriented motion-compensation-based video compression standard developed by the ITU-T Video Coding Experts Group (VCEG) together with the ISO/IEC JTC1 Moving Picture Experts Group (MPEG); the project partnership effort is known as the Joint Video Team (JVT). Other video formats may also be used in alternate embodiments. The second track 212 may be a metadata track 212 which includes information about interactive features of the multimedia content in stream container 208. The metadata track 212 may be referred to as an MDVM track, and may be encoded using a variety of languages (e.g. eXtensible Markup Language—XML). The stream container may include additional tracks, e.g., third and fourth tracks 214 and 216, respectively, which may include audio data. For example, the third track 214 may contain left audio data, and the fourth track 216 may contain right audio data. Audio track may be encoded according to virtually any audio formats, for example any standard format, such as Advanced Audio Coding—AAC. Additional tracks may be included, which may contain other information, such as left and right rear audio, three dimensional video information (e.g. one track for left eye video, a different track for right eye), tracks for alternate sensory information (e.g. tactile, odor, etc.) or any other information as may be desired. The video and audio tracks described herein may be implemented using pre-recorded, accessible video and/or audio. In some examples, the video and audio tracks described herein may be implemented using real-time streaming audio and/or video. Similarly, the specific ordering of the tracks as presented (e.g. track one 210 for video, track two 212 for information about interactivity, etc.) is not intended to limit the description and the tracks may occur in any order and still represent the present embodiments. The various elements as shown for the file format 202 are presented as if each track 210-216 runs in parallel to one another and the keyframe headers 206 simultaneously mark all tracks. However, this view is intended only as a conceptual representation as these elements may exist in sequence within the format.

Figure 3B:
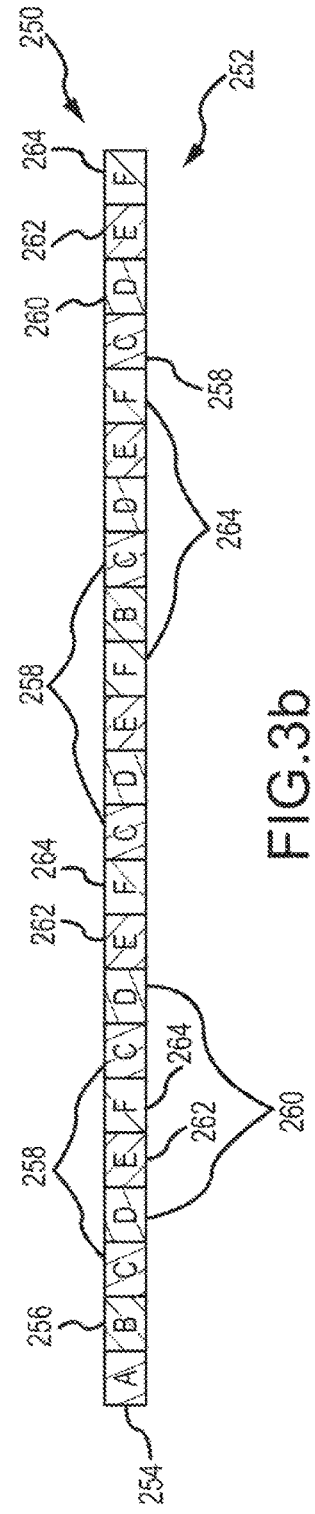
FIG. 3b is a block diagram of a sequential view of an example embodiment of a file format according to the present disclosure.

FIG. 3b is a block diagram 250 of an example sequential view of a file format described herein. As previously described, block diagram 200 in FIG. 3a shows a conceptual view of the file format 202 (e.g., in which a parallel stream of multiple tracks 210-216 are interspersed by keyframe headers 206). To facilitate an understanding of the present disclosure, FIG. 3b shows a sequential view of a file format (also referred to herein as sequential file 252) according to some examples herein.

The sequential file 252 begins, as previously described, with an optional stream header 254 containing basic information for how to interpret the file encoding, such as frame rates, number of tracks, audio and video encoding formats, etc. The sequential file 252 may include a single stream header 254 for all tracks in the file. The sequential file 252 may also include one or more keyframe headers, (e.g., a keyframe header 256 indicating the beginning of a keyframe), each keyframe header associated with a keyframe of the sequential file. A keyframe header 256 in sequential file 252 may be followed by a plurality of difference data blocks. In other words, the next series of elements in the sequential file 252 are the difference (or otherwise relevant) data between keyframes (e.g., data blocks or data elements 258, 260, 262, 264). The difference data blocks may include difference video data, difference audio data, and/or difference metadata. As indicated by the letter encodings (a)-(f) for each element 254, 256, 258, 260, 262, and 264, respectively, in between the keyframe headers 256, other elements 258, 260, 262, and 264 may repeat. Shown is an example stream containing a stream header 254 followed by a keyframe header 256, followed by three sequential data elements or blocks comprising an encoded video block 258, a metadata block 260, and encoded audio blocks 262, 264 (e.g., encoded left audio data block 262, and encoded right audio data block 264) before the next keyframe header 256, which is followed by two more repetitions of an encoded video block 258, an encoded metadata clock 260, and encoded audio blocks 262, 264. This repetition of sequential elements of all relevant track information 258, 260, 262, and 264 between keyframe headers 256 may occur for some unspecified duration or count within the file allowing for arbitrary file length representing arbitrary durations. It will be understood that if additional tracks are included, they may be incorporated as part of the track sequence 258, 260, 262, and 264 according to the specified track ordering, for example by including one or more additional data elements or blocks following the sequence of data blocks 258, 260, 262, and 264.

The file format shown in FIGS. 3a and 3b and described herein may generally be implemented as a source file. The source file may be encoded as a data stream for transmission and/or receipt by a video player. The encoded file may be referred to as a data stream format resulting from encoding of the source file format described herein.

Figure 3C:
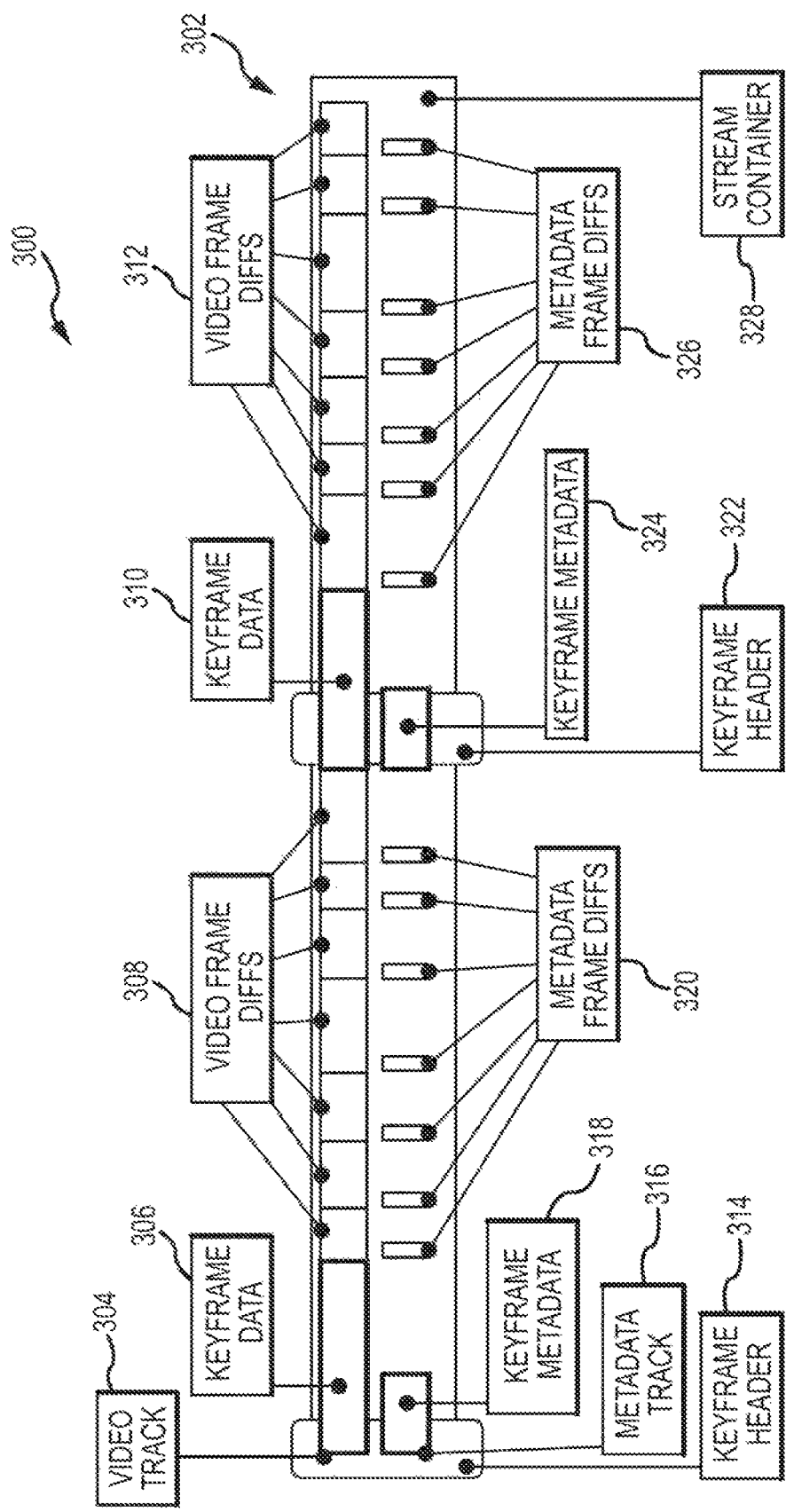
FIG. 3c is a block diagram of a conceptual view of an example embodiment of a file format with temporal compression according to the present disclosure.

FIG. 3c is a block diagram 300 of an example of a MDV file format with temporal compression described herein.

Temporal compression is a common technique used with video formats (commonly in conjunction with keyframes) to provide a more efficient method for relaying video information. FIG. 3c shows a conceptual view (similar to FIG. 3a, 200) also illustrating the different data element sizes for each piece of information. By extension, those data elements which may not vary in size (e.g. audio) have not been included in this diagram 300. The file format 302 for interactive multimedia content includes all elements (e.g., data blocks) within a stream container 328 (similar to file format 202 in FIG. 3a). The stream container may include a plurality of tracks, e.g., a first track 304 which in this example is a video track and a second track 316 which in this example is a metadata track. The stream container may include a plurality of keyframe headers (e.g., keyframe headers 314 and 322) and a plurality of keyframe data blocks and difference data blocks following each keyframe header. In this example, the beginning of the file is indicated with the keyframe header 314. Video track 304 includes keyframe video data 306 followed by video frame difference information 308 (e.g., video difference data blocks 308). The metadata track 316 includes keyframe metadata 318 followed by metadata frame difference information 320 (e.g., metadata frame difference data blocks 320), shown conceptually as parallel elements within the file format 302. A second keyframe header 322 is followed by keyframe video data 310 in the video track 304, and by keyframe metadata 324 in the metadata track 316. As before (e.g., FIG. 3a, 200, FIG. 3c, 308, 320) the frame differences for the video data (e.g., video difference data blocks 312) and the metadata (e.g., metadata difference data blocks 326) repeat as necessary. It will be appreciated that the any of the elements or data blocks herein (e.g., 306-326) in the stream container 328 may have different sizes as corresponding to the amount of data in a given block.

Metadata according to the present disclosure, e.g., as described previously with reference to FIGS. 2 and 3, may, but need not, be packaged within the same file which contains the content data. That is, in some examples, metadata may be formatted and transmitted separate from the content data (e.g., video data, audio data, or combinations thereof). The metadata may be called (e.g., by referencing a URL comprising definitions of certain metadata information items) at the time of playback of the content data, as described herein. Metadata may be formatted into an annotations or metadata file (e.g., MDVM file) described in further detail below with reference to FIGS. 4a-4c, which file may comprise information similar to the information provided in a metadata track (e.g., tracks 212 and 316 of FIGS. 3a and 3c, respectively) of an integrated interactive multimedia file (e.g., MDV file).

Figure 4A:
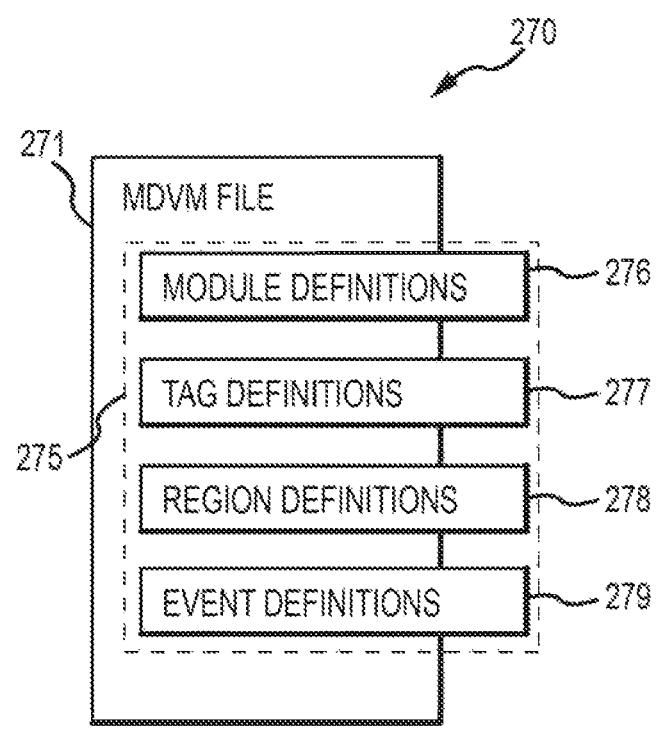
FIG. 4a is a block diagram of an annotations or metadata file (e.g., MOBILEDIRECT Video Metadata (MDVM) file) according to some examples of the present disclosure.

FIG. 4a is a block diagram 270 of an example annotations file, also referred to herein as metadata file. The metadata file 271 (e.g., MDVM file 271) may include a plurality of data blocks 275 comprising one or more full metadata blocks or metadata difference data blocks (e.g., blocks 402 and 452 in FIGS. 4b and 4c, respectively). These blocks of the metadata file 271 (e.g., MDVM file 271) may contain definitions for modules, tags, regions, and/or scripting events, which together may describe the interactivity of a piece of media content. Modules and tags may be referenced externally by URL, and loaded at run time by a multimedia player (e.g., MDV player 502). More specifically, module definitions 276 may comprise executable instructions which define classes of interactions. Tag definitions 277 may include information defining chunks of content that may be invoked via a given interaction. Region definitions 278 may include spatial information defining a visual location interactive content within a frame. Event definitions 279 may include information defining one or more actions to be taken in response to a given interaction (e.g., in response to a click within a region trigger auto play of content, as may be defined by a tag).

FIG. 4b is a block diagram 400 of an example metadata block structure within a MDVM file described herein. As previously described a metadata stream (e.g., metadata tracks 212, 316 of FIGS. 3a, 3c) may include a full block 402 (also referred to as keyframe metadata 318, 324 in FIG. 3c). The full metadata block 402 contains (but is not limited to) multiple different relevant information elements, including, for example, tags 404, frame regions 406, objects 408, and scripting events 410.

Tags 404 (explained in more detail in FIG. 6a, 600) contain various informational items such as publication information, properties, and groups of properties, related files and images, uniform resource locators (URLs), features, attributes, or other relevant information descriptions. Tags can be embedded within the MDV stream (e.g., as metadata track 212, 316), or may be externally referenced, e.g., by URL, and downloaded by the multimedia player. Regions and Objects can have any number of MDVM Tags associated with them. Frame regions 406 describe which location within a frame contains relevant information, e.g. for a tag description 404, object 408, or scripting event 410.

For example, in the context of interactive video content, a frame region 406 may describe the visual location within a video frame which contains relevant information. As previously noted, video may be presented as two-dimensional or three dimensional, and thus frame regions may be described either in two or in three dimensions within the visual content, and may be specified for a specific duration or number of frames. A region may take on any shape, such as two-dimensional shapes such as rectangles, circles, polygons, and/or curves. Three-dimensional shapes such as cubes, cones, and prisms may also be used to define regions. Objects 408 may include identified conceptual elements within the video frame, such as faces (from facial detection), objects or patterns (from object or pattern detection; e.g. vehicles, people, structures, sporting equipment, colors, repeated actions or behaviors, predicted locations for future visual elements, etc.), and may be rectangular, circular, polygonal, curvilinear, or any other type of shaped region. Frame regions may move between frames, providing for the perception of animated movement for the region, or may be defined as a transformation, which changes over time. Any algorithmic processing techniques which may apply to video may produce outputs relevant to store within the object element 408 of the metadata block 402. Finally, scripting events 410 are records of specific programmatic actions which may occur for any viewer interaction relevant with any of the other metadata elements (e.g. tags 404, regions 406, or objects 408). A scripting event 410 may include displaying additional information (e.g. tags 404), operating a shopping cart, calling an application programming interface (API) for integrating with other applications external to the multimedia player, creating animation or static drawing elements within the video, modifying the current frame or video content, pausing, rewinding, fast forwarding, changing colors, adding sound effects, and/or other manipulation of the visual or auditory components of the multimedia file. Scripts can be defined as externally loaded modules (via a separate URL), internally loaded modules (referenced from the same MDV digital container) or inline with the metadata (interleaved with video frames).

Accordingly, examples of data structures described herein may include scripting events, e.g. scripting events 410. Scripting events generally refer to automated injection or user-defined injection of attributes, features, properties, and/or other information to further render the frame or frames of the video interactive and/or informative. In examples herein, a scripting event may be executed in response to a trigger, which may be a system event or a user interaction with a region. A variety of triggers may trigger a scripting event. Examples of triggers may be a touch, swipe, click, enter/exit of application, voice input, and/or look. Any number of system events may function as triggers, for example a system clock reaching a predetermined time or a counter indicating a certain number of views or viewers of a video file. A system event may be associated with a region in the frame (e.g., a person's face). A system event may trigger the execution of a scripting event when the region (e.g., the person's face) comes into view during playback. System events may be associated with regions or may be associated globally with a property or an attribute of the video file. For example, starting or stopping playback of the video file may comprise a system event which may trigger the execution of a scripting event. In some examples, a system event may occur when a given content file becomes available for viewing (e.g., is published by the content producer or becomes hosted on a website). The specific examples of system events herein are provided for illustration only and it will be appreciated that virtually any type of system event may serve as a trigger for a scripting event according to the present disclosure. The scripting event itself may refer to a module of code that determines the application's behavior when the event is triggered. For example, a scripting event might be "add To Cart" which adds a currently selected tag to a shopping cart. Other things can be implemented as scripting events as well including, but not limited to starting/stopping a video, changing a video to a different stream, playing a sound, sending an email, and/or launching an algorithm or another application—generally any action that may be specified with computer code.

In examples, supportive metadata about the scripting events may be specifically retrievable at a specific time of the video (e.g. by region of a single frame, regions of a single frame, region(s) of multiple frames. The scripting events may be associated with one or more tagged regions (which may, for example, be a region of video in one or more frames). The scripting events may define actions that occur when a user or other process interacts with the tagged regions (e.g. click, touch, hover over, otherwise select, highlight, hover over, look at, etc. the tagged region). An event may generally refer to a category within a script that may allow for automatic retrieval of the event within the video, and may be placed into the proper region of the video as metadata. In this manner, for example, a user may highlight a product or other object in a video being displayed to the user, and the scripting action may, responsive to that user action, specify that a particular action occur (e.g. a text or other description of the object is displayed over the video, for example). In this manner, for example, a user may receive more information or even order a product by interacting with video as the video is presented to the user.

Scripting events may be defined by scripting modules, which may be embedded within examples of the MDV file format or located externally and referenced, for example by URL or other path. Scripting modules may be written in JavaScript or other scripting languages.

Scripting events may be referenced within the media's metadata descriptors, and included along with the "region" and "object" descriptions.

For example, the metadata may describe a rectangular "region" 150 pixels wide and 100 pixels high beginning at coordinate (400,400) that begins at the :23 second mark of a video and extends to the :25 second mark. This region has the "Sage ONE Fly Rod" tag associated with it. Touching or clicking this "region" will trigger an "AddToBin" scripting event which will add the "Sage ONE Fly Rod" to the user's virtual shopping cart.

The above example may be represented in a metadata file (e.g., MDVM file) using any suitable scripting language, an excerpt of a metadata file comprising the example scripting event may be as follows:

```
{
  "modules" : {
    "shoppable"
"https://api.mobiledirect.technology/mdv/modules/shoppable.component"
  },
  "tags" : {
    "SageONEFlyRod"
"https://hosted.mobiledirect.technology/sage/products/sageoneflyrod.json"
  }
  "regions" : [
    {
      "type" : "RegionRect",
      "bounds" : { "x": "400", "y" : "400", "width" : 150, "height" : 100, "start": 23.0, "duration": 2.0 } ,
      "tags" : [ "SageONEFlyRod" ],
      "events" : [ { "on" : "click", "do" : "shoppable.AddToBin" } ]
    }
  ]
}
```

In this example, the "AddToBin" scripting event is described within the "shoppable" module which is externally referenced by URL within the metadata.

FIG. 4c is a block diagram 450 of an example metadata block difference (diff) structure within a file format described herein. Just as with video keyframe approaches containing a header frame and a difference block, the metadata of the embodiments also may include a full metadata block (FIG. 4b, 402) and a difference block 452. The metadata diff block 452 contains (but is not limited to) multiple different relevant information elements, including, for example, tag diffs 456, frame region diffs 458, object diffs 460, and scripting event diffs 462. In addition, the metadata diff block 452 contains a keyframe reference element 454.

The keyframe reference element 454 provides information as to which keyframe in the file format (FIG. 3c, 314, 322; FIG. 3a, 206) contains the full base information for the current set of difference information. With this keyframe information the difference information can be computed if information is lost from the culmination of previous difference calculation events, or the differences may be explicitly computed from the keyframe at every difference point. Thus, the tag diffs 456 could be the difference in tag information from the previous cumulative tag diff calculations since the last keyframe, or may be a simple difference from the last keyframe. Similarly, the frame region diffs 458, object diffs 460, and scripting event diffs 462, could be cumulative differences from the last keyframe or literal differences from the last keyframe.

Examples of the present invention accordingly include systems, apparatuses, methods, and computer readable instructions for encoding the file formats described herein and/or generating data (e.g. stored data or streaming data) in accordance with the file formats described herein. For example, video data may be encoded into any of the file formats described herein using a codec or other hardware and/or software system, e.g. see the system of FIG. 1. The tag, region, object, and/or scripting events may be assembled as shown in FIGS. 3-4 for providing the video or other data in the file format shown.

Apparatuses, systems and method for playback of interactive multimedia content according to the present disclosure are described herein. Figure 5a is a flow chart of an example method 550 for playback of interactive content according to some examples. The method 550 comprises receiving a file or stream comprising content data, and receiving a file or stream comprising metadata, as shown in box 555.

In some examples, the content data (e.g., video data, audio data, or combinations thereof) may be included in the same file or stream. That is, the file or stream (e.g., as received in box 555) may include both the content data and the metadata (e.g., an MDV file or stream). The file or stream may include a plurality of tracks comprising the content data and metadata. For example, the file may include a first track comprising audio data, video data, or combinations of the two. The file or stream may include a second track comprising the metadata which may include at least one tag and a scripting event associated with a region of a frame of the content data. The method may include decoding the content data (e.g., decoding video data with a video decoder, decoding audio data with audio decoder) and decoding the metadata using a metadata decoder, as shown in boxes 560 and 565. The method further comprises receiving an indication of a trigger, as shown in box 570, and executing the scripting event responsive to receipt of the indication of the trigger, as shown in box 575. In some examples, the trigger may comprise a system event or a user interaction with the region.

In some examples, the trigger may be a user interaction responsive to a selection of the region with a cursor controller. In such examples, the method may further comprise receiving an indication of a captured content item responsive to the selection of the region. In some examples, the method may include displaying a visual cue responsive to receiving the indication of the captured content item without interruption to a playback of the content data (e.g., a visual cue may be displayed without interruption to a displaying of the video data, as shown in box 585). In further examples, the method may comprise displaying a listing of captured content items following termination of playback (e.g., upon termination of displaying of the video data, as shown in box 590) and receiving a selection of a captured content item from the listing. In further examples, the method may include launching an application responsive to the selection of the captured content item.

In some examples, the region may be associated with a first set of coordinates in the frame. The method may comprise tracking a change of the region between successive frames of the video data, including determining a second set of coordinates in the frame corresponding to the region in a subsequent frame. For example, the method may include tracking a movement of the region between successive frames, as shown in box 580. In some examples at least portions of the data (e.g., a portion for the metadata, video data, audio data, or combinations thereof) in the content stream may be encrypted. In such examples, the method may further include decrypting at least a portion of the metadata prior to receiving the indication of user interaction with the region.

Figure 5B:
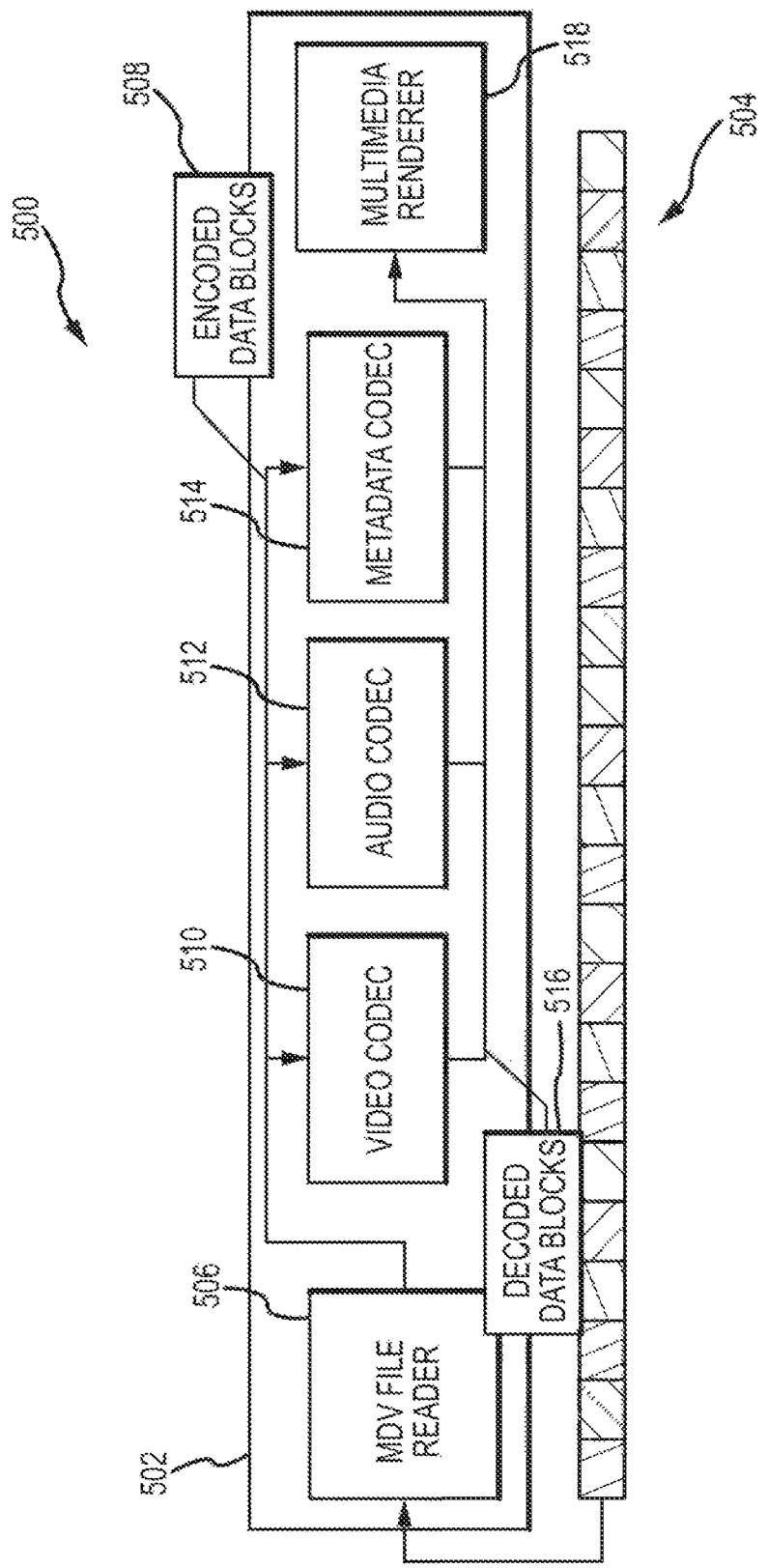
FIG. 5b is a flowchart of a method for reading an interactive distributed multimedia stream according to some examples of the present disclosure.

Functionality described above with respect to FIGS. 5a-5c may be built into a multimedia player, such as the MDV player 502 described herein. FIG. 5b is a flowchart 500 of one particular method for reading an interactive distributed multimedia stream according to embodiments of the present disclosure. The operation of the MDV player 502 begins by taking input from a multimedia stream (e.g., an MDV stream 504, such as defined in FIG. 3a, 202; FIG. 3b, 252; or FIG. 3c, 302). The multimedia stream (e.g., MDV stream 504) may be a live stream (e.g. a stream actively being read from a storage device, streaming direct from any media source such as a camera, or being fed from another location), a pre-recorded stream, or from a file saved to local storage for play at a user's convenience. The multimedia stream may include audio data, video data, metadata, or combinations thereof. The terms multimedia stream and content stream may be used interchangeably herein. The multimedia stream may be received in the MDV player. The multimedia stream (e.g., MDV stream 504) is interpreted by a file reader (e.g., an MDV file reader 506). Actions within the MDV file reader 506 include steps such as reading the MDV header information which includes the definition and ordering of the tracks, recognition of keyframes, and the like. Output from the file reader (e.g., MDV file reader 506), in the form of encoded data blocks 508, is interpreted by the appropriate codecs (e.g., video codec 510, audio codec 512, and/or MDVM metadata codec 514) depending upon the particular data track. The appropriate codec then converts or decodes the encoded data blocks for the appropriate track 508 into decoded data blocks 516 which are then sent to a multimedia renderer 518. The multimedia renderer 518 displays the video, plays the audio, and represents the interactive metadata information from the file 504. The multimedia player (e.g., MDV player 502) may receive an indication of user interaction with the multimedia content, for example an interaction with a region within a frame of the video data. The multimedia player may execute a scripting event responsive to the interaction. That is, the multimedia renderer 518 may display and/or take other action as specified by one or more scripting events conveyed in the MDV stream, and responsive to user interaction in some examples.

Figure 5C:
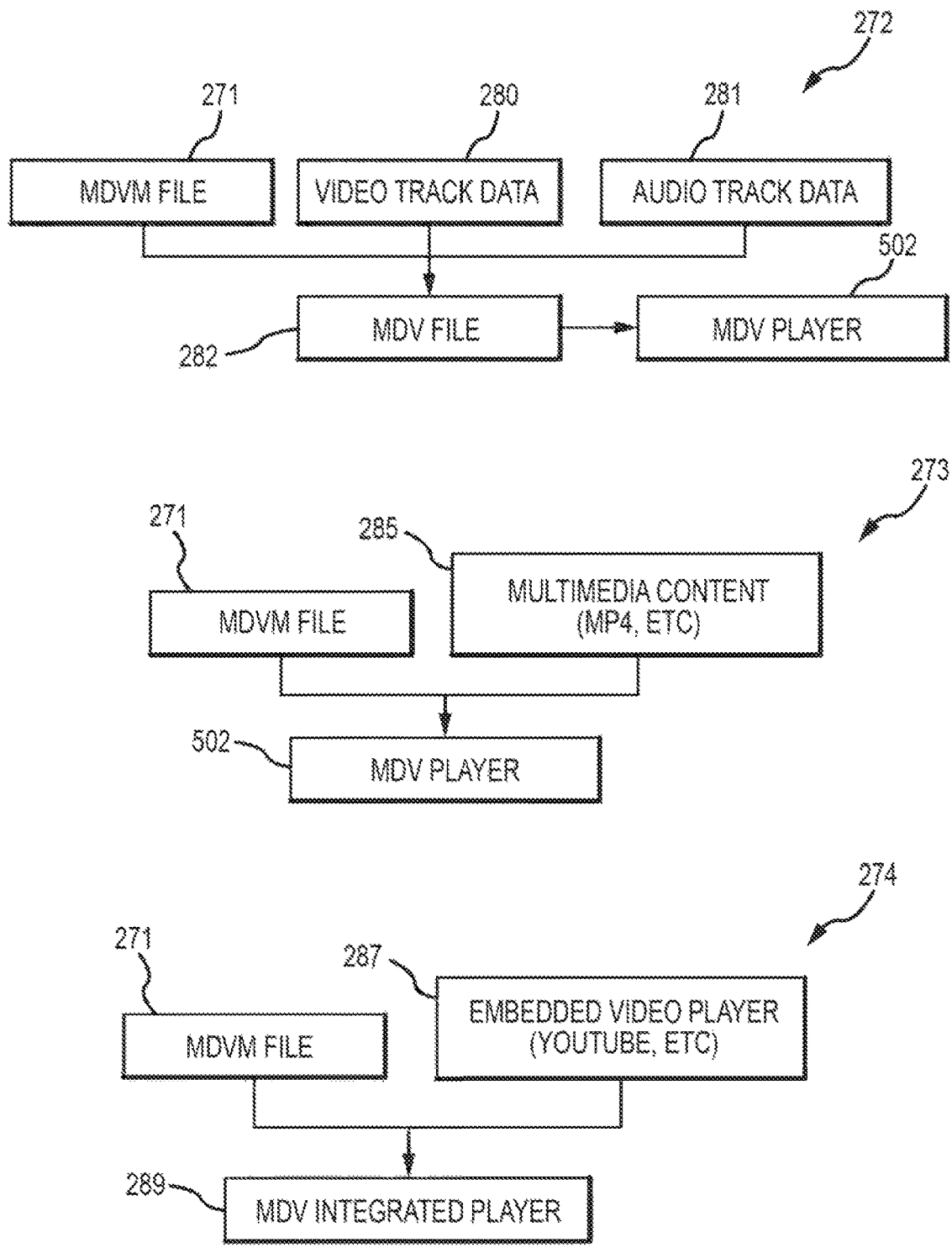
FIG. 5c is flowcharts of methods of use of metadata files according to some examples of the present disclosure.

FIG. 5c illustrates additional examples according to the present disclosure. As described herein, in a first example 272, an annotations file (e.g., MDVM file 271) can be encoded along with encoded audiovisual data (e.g., including video track data 280 and/or audio track data 281) to create an annotated file (e.g., MDV file 282) for rendering by a multimedia player (e.g., an MDV player 502). The MDV file 282 may include a plurality of information tracks, e.g., as described with reference to FIGS. 3a-3c. In a second example 273, an annotations file (e.g., MDVM file 271) may be generated, edited, stored and/or transmitted separately and may be used along with a previously encoded content file or media file 285 (such as MP4) to be rendered by a multimedia player such as MDV player 502. In a third example 274, an annotations file (e.g., MDVM file 271) may be integrated within a third party video player 287 (such as the embedded YOUTUBE video player) to provide additional functionality as may not be currently available on known third party video players (e.g., in an MDV integrated player 289).

Figure 6A:
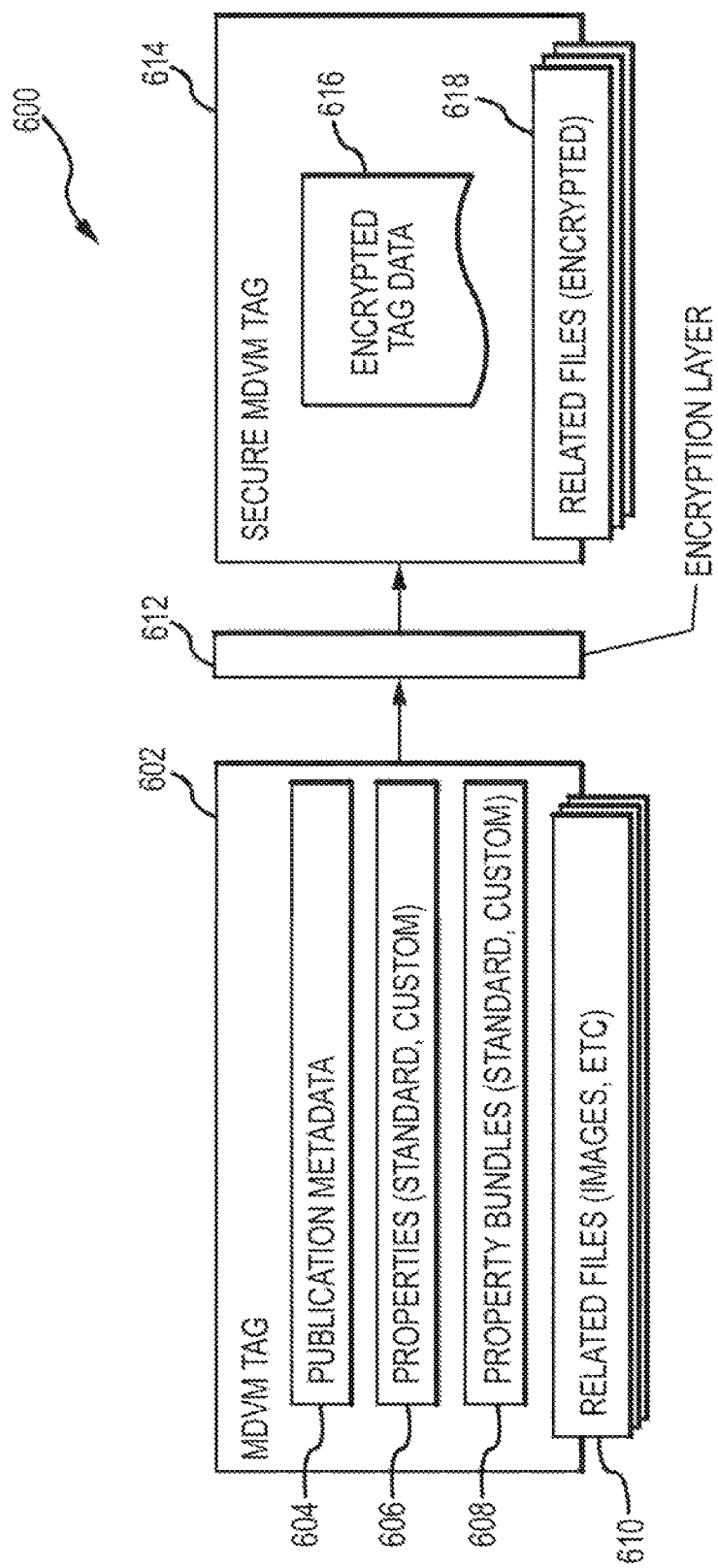
FIG. 6a is a block diagram of an example tag block content and optional encryption layer within a file format according to some examples of the present disclosure.

FIG. 6a is a block diagram 601) of an example tag block content and optional encryption layer within a file format according to embodiments. As previously described in FIG. 4b, one element of the metadata block 402 is a tag element 404 (e.g., MDVM tag 602). An MDVM tag 602 within a metadata block (e.g., metadata block 402) may include publication metadata 604, standard and custom properties 606, and standard and custom property bundles 608. Related files 610 as may be appropriate for a particular application, may also be included. Related files may include images, documents, videos, and the like.

An MDVM Tag 602 is a modular, downloadable piece of metadata which can be used by an MDV stream while it plays. As previously described, some or all of the metadata may be included in a same file or stream containing the content data (also referred to as content file or content stream) according to the present disclosure (e.g., in an MDV file 282). In further examples, some or all of the metadata may be separate from the content file or stream. For example, at least a portion of the metadata, e.g., one or more MDVM tags 404, 602, may not be included in the MDV file or stream (e.g., file or stream formatted according to the examples herein and described with reference to FIGS. 3-4). In some examples, the MDV file may contain a metadata track comprising at least a portion of the metadata as may be required for providing interactive content. For example, when MDVM Tags are not included directly in the MDV file or stream, bandwidth requirements for playback of an MDV file or stream may be reduced, which may allow a player to cache and re-use tag information, and/or allow the player to request only those tags which are necessary for user interaction. A further advantage of decoupling MDVM tags from the MDV file or stream may be the ability to update tag data, e.g., by a tag publisher, without needing to redistribute a new or updated content file. MDVM Tags may be referenced by URL in the MDV stream. The MDV player may download an MDVM tag in response to user interaction (e.g. touch, click, highlight, look) and pass it in to a scripting event. An MDVM tag 602 may include: Tag publication data (e.g. tag id, name, publication date, expiration date, and available bundles), Tag properties (e.g. an arbitrary list, of attributes, listed in key/value pairs, nested properties are possible), and Tag bundles (e.g. a subset of properties, features, and/or attributes).

In some embodiments, an MDVM tag 602 data may be secured to prevent undesired access. In those situations an encryption layer 612 may be used to encrypt the raw data into a protected secure tag 614. The encrypted tag data 616 is held within the secure tag 614 in an otherwise unreadable format. Related files may also be encrypted 618 as may be appropriate. Thus, a risk of determining tag content or related file content embedded within or accompanying a multimedia file (e.g., content file or stream) through unauthorized access may be reduced or avoided.

Figure 6B:
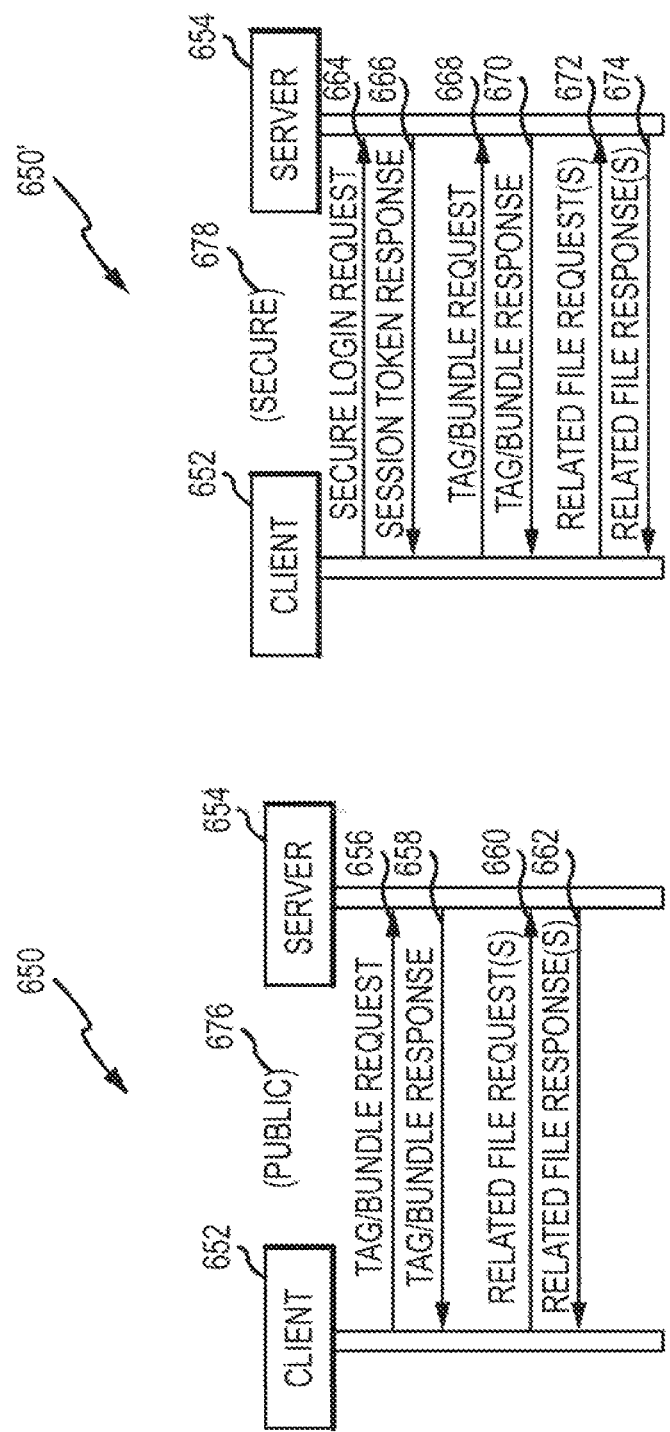
FIG. 6b is a sequence diagram of an example representation of client-server interactions in both a public and a secure environment according to some examples of the present disclosure.

FIG. 6b is a data flow diagram 650 of one particular representation of client-server interactions 676, 678, in a public environment and a secure environment, respectively, according to some embodiments of the present disclosure. This scenario may exist when a multimedia player (e.g., the MDV player 502) acts as a client 652 communicatively coupled (e.g., via the internet or other communication network) to a server 654, which may be a remote system may be a separable element within the same embodied system comprising the client. Notably, public interactions 676 may be interactions associated with a standard MDVM tag (e.g., MDVM tag 602) while secure interactions 678 may be interactions associated with an encrypted MDVM tag (e.g., MDVM tag 614). In each case the data flow diagrams 650, 650' represent the client 652 as the origin of a request and the server 654 as the recipient of the request.

For a public interaction 676, the client 652 generates a tag/bundle request 656. Since this information is not encrypted, the server is able to directly send a tag/bundle response 658. If there are any related files embedded within the tag, the client 652 subsequently sends one or more related file request 660, and the server is again able to directly return the one or more related file response 662.

For encrypted tags (FIG. 6a, 614) a secure interaction 678 is used. The client 652 also originates the interaction, but in this scenario the original token exchanged is a secure login request 664 with the proper login or encoding credentials. The server, upon validating the login request, returns a session token response 666. Now, just like with the public interaction 676, the secure interaction 678 continues with a tag/bundle request 668 and a tag/bundle response 670 from the client 652 and server 654 respectively. Also, if applicable, one or more related file requests 672 are sent by the client 652 and the server 654 responds with the one or more related files 674. Notably, the secure token 666 is sent in subsequent client 652 requests 668, 672 and validated by the server 654 before any data is returned.

Figure 7:
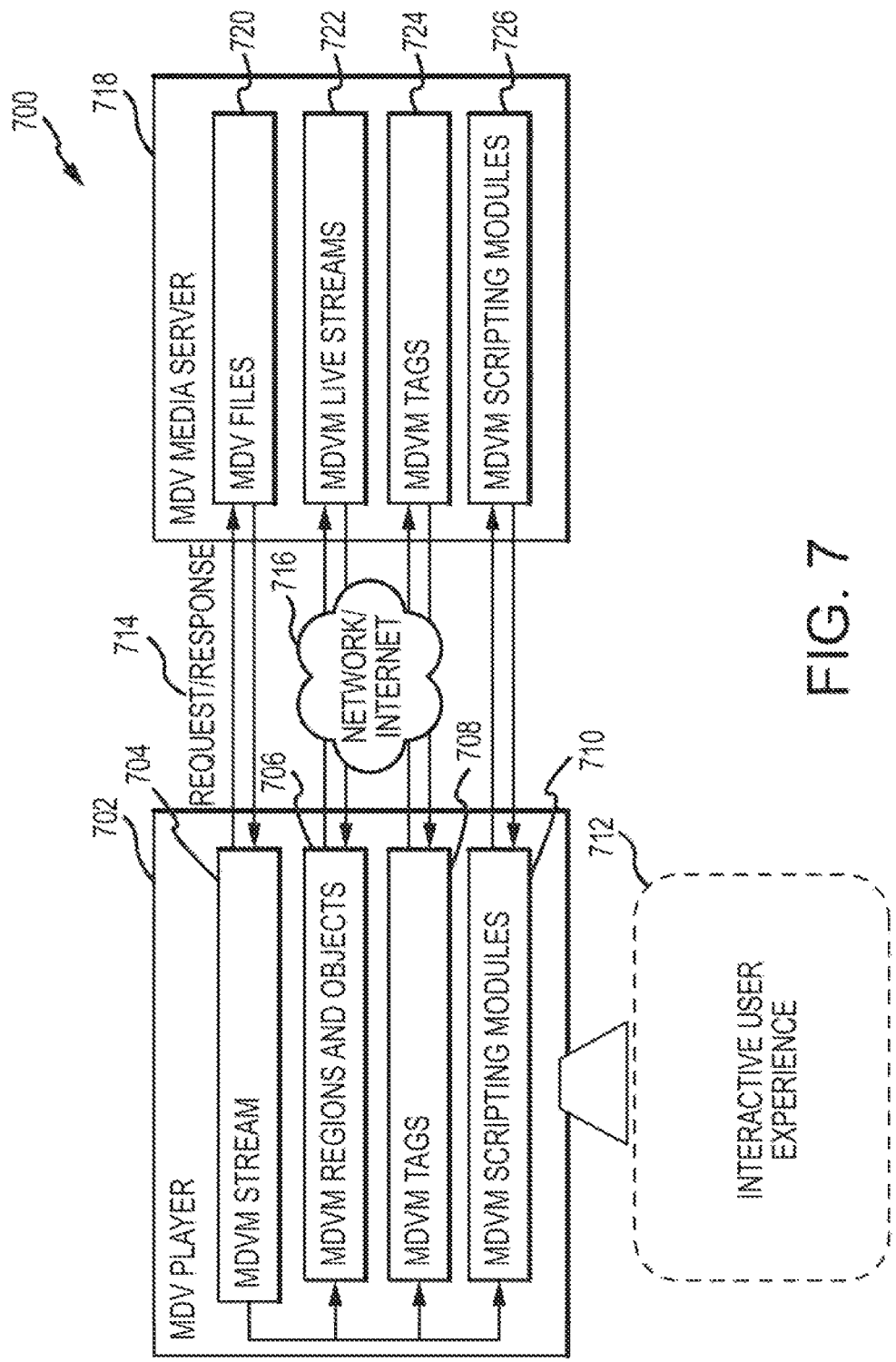
FIG. 7 is a data flow diagram of a simplified representation of an interactive distributed multimedia player and server interaction according to some examples of the present disclosure.

FIG. 7 is a data flow diagram 700 of a simplified representation of an interactive distributed multimedia player and server interaction according to some embodiments of the present disclosure. As illustrated, the multimedia player (e.g., MDV player 702, which may be implemented using the player shown in FIG. 5b, 502) may be communicatively coupled to a media server (e.g., MDV media server 718) via a wired or wireless connection (e.g. Network/internet 716). The multimedia player (e.g., MDV player 702, MDV player 502 in FIG. 5b)) may function as the client 702 and may communicate with the server 718, which may be a remote system or which may be a separable element within the same embodied system. The media server 718 may include one or more data storage devices (e.g., databases) which may include MDV files, MDVM files or portions thereof, for example MDVM stream(s), MDVM tags, MDVM scripting events or modules. When the MDV player 702 interprets an MDV stream 704, it also may interpret the metadata track (e.g., track 212 and 316, which may include metadata blocks 260, 402 and 452). The MDVM metadata track interpretation may include interpreting definitions of regions and objects 706, tags 708, and scripting modules 710 for rendering by a player (e.g., MDV player 702). When rendered by the MDV player 702, these metadata information items (706, 708, 710) allow for an interactive user experience 712 with the media or content.

To properly render the metadata, the MDV player 702 may interact with the MDV media server 718 via a series of requests and responses 714 from the player 702 and server 718, respectively. Accordingly, the stream 704 may request 714 appropriate files 720 which are returned 714 by the server 718. Similarly, the regions and objects 706 may request and receive 714 live streams 722, the tags 708 may request and receive 714 tags 724 or tag information (see also FIG. 6b, 650), and scripting modules 710 may request and receive 714 scripting modules 726 or scripting information. Through this use of a player 702 and server 718, not all detailed information needs encoding within the stream 702 to provide a fully interactive experience 712.

Figure 8A:
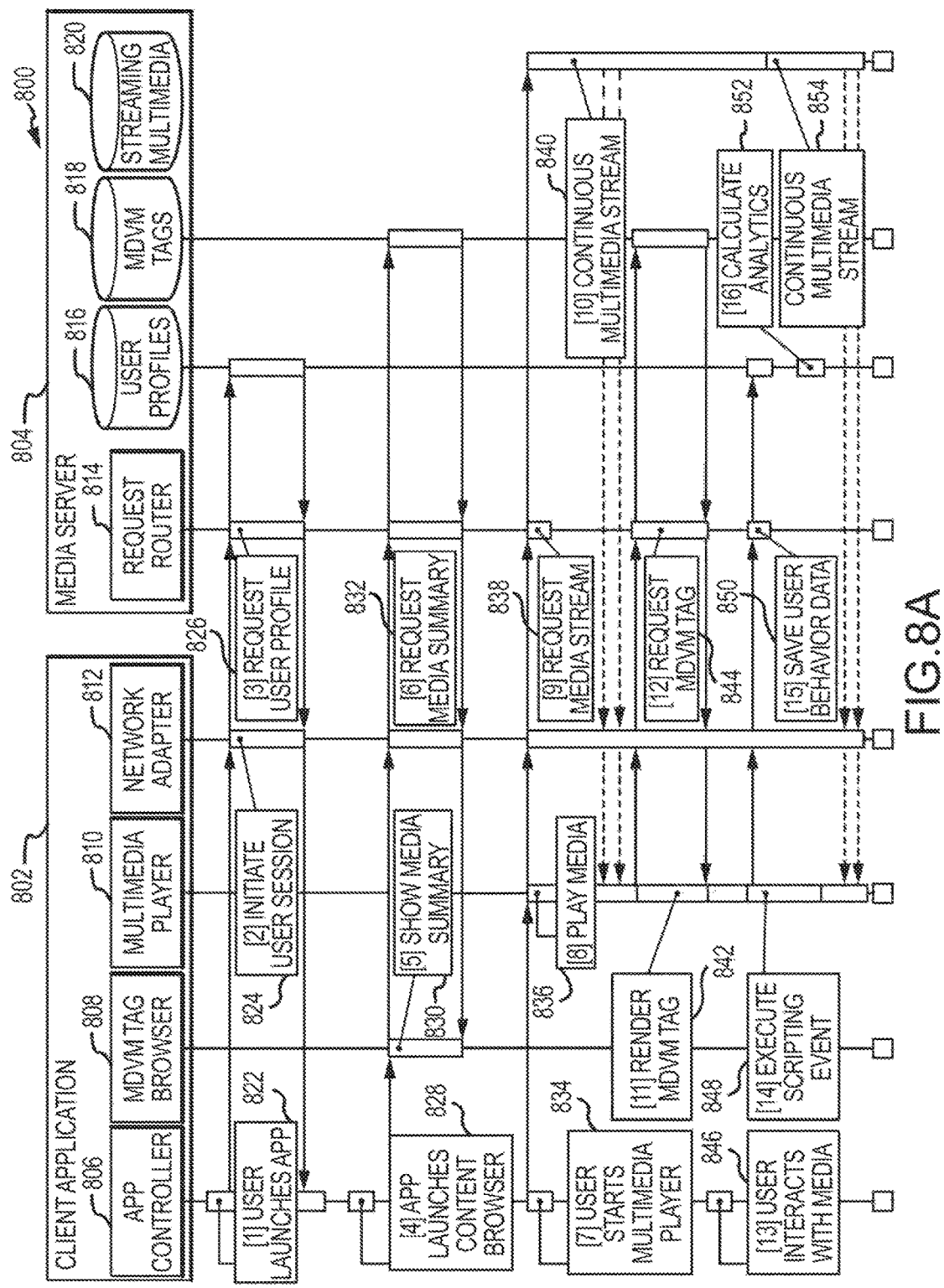
FIGS. 8A and 8B are a sequence diagram of one particular representation of an interactive distributed multimedia player and server interaction according to some examples of the present disclosure.
Figure 8B:
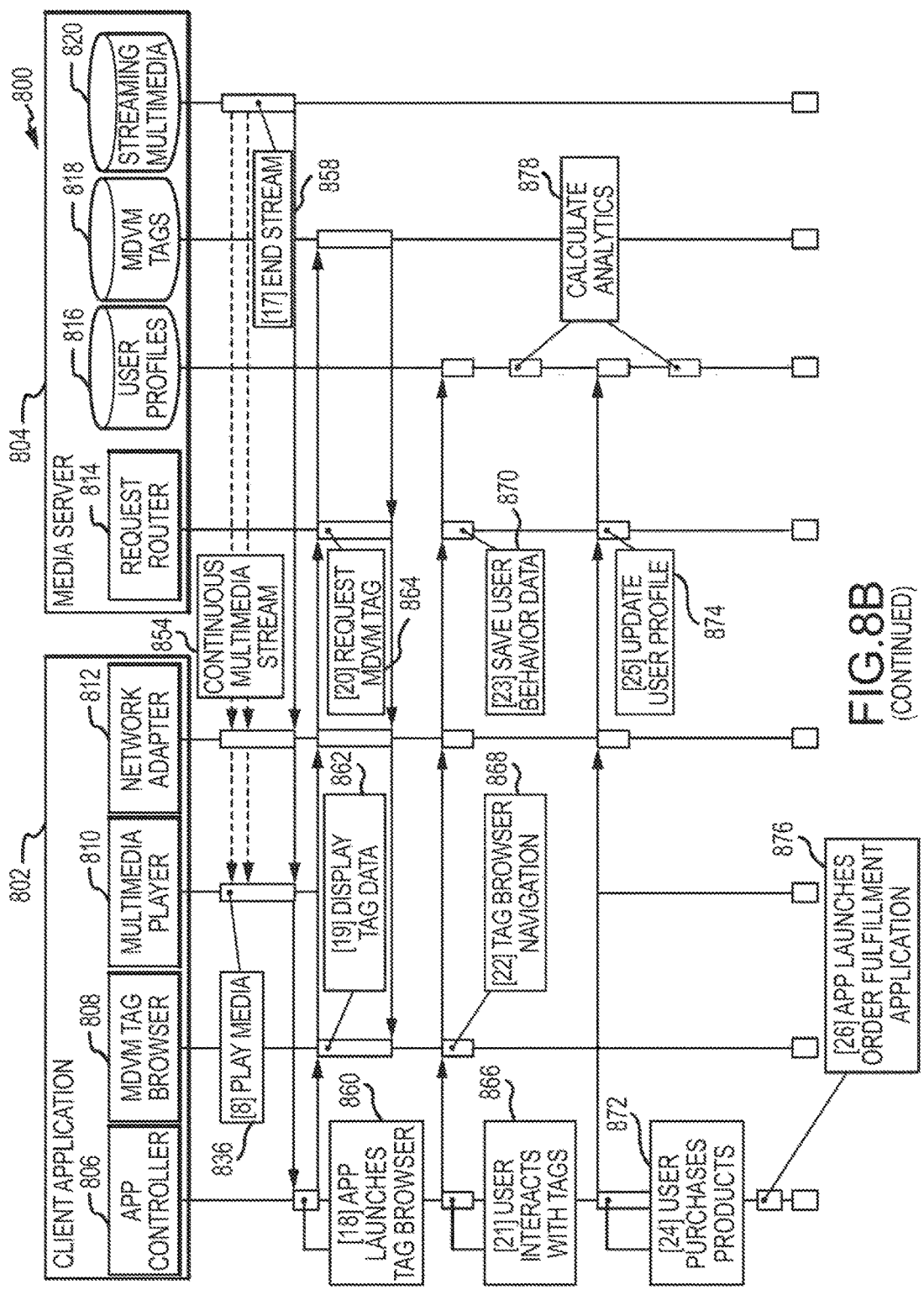

FIGS. 8A and 8B show a data flow diagram 800 of one particular representation of an interactive distributed multimedia player and server interaction according to embodiments. In this data flow diagram 800, the client application 802 includes an application controller 806, a MDVM tag browser 808, a multimedia player 810, and a network adapter 812. Further, there exists a media server 804 which may comprise a processor and memory with processor-executable instructions according to the examples herein. In this specific example, the media server 804 comprises a request router 814, a user profile database 816, a MDVM tag database 818, and streaming multimedia data 820, which may include an MVDM track which may request MDVM tags as needed, for example as indicated by user interaction. The processor of media server 804 may be communicatively coupled to one or more data storage devices (e.g., databases 816, 818, 820). Streaming multimedia data 820 may include, for example, encoded MDV files, MDVM files, other media content such as MP4/MOV/FLV/etc., and/or embedded third party content such as YOUTUBE/BRIGHTCOVE/etc. Interactions with each of these application and server elements (806, 808, 810, 812, 814, 816, 818, 820) are shown as boxes on the vertical lines below their specific labels. The data flow begins in the upper left when the user launches the application 822 and tracks right and left according to the directional arrows. For aid in reading the data flow diagram, each significant interaction point is prefixed with a numeric in square brackets sequentially increasing from [I] to (261. Only one path of data flow is shown to represent one activity of which numerous interactions are possible within the present embodiments.

For further context, the data flow is perceived by the user as interaction with a multimedia application sometimes referred to as "MobileShop". The interactive video player 802 which plays MDV files and responds to user events by executing scripting modules may come pre-loaded with scripting modules to handle basic interactions, such as: touch frame, add to MobileShop, track user behavior and synchronize with a "MobileShop" server. The player 802 may also define a standard set of MDVM Tag "bundles" that can be used with MobileShop scripting modules. This includes (but is not limited to): "Streaming Product" bundle, "Product Summary" bundle, and "Product Description" bundle. Furthermore, the player 802 has a built-in content browser 828 to locate desired content, as well as a "Mobile-Shop" browser so that the user can browse "captured content" (such as items from the vendor's product catalogue) after viewing. As shown in this embodiment, all interaction may be cloud-based. The content browser 828 is linked to content on a media server 804, while the MobileShop browser 808 is linked to profile information 816 also on the cloud.

Content can be viewed in "streaming" mode (as shown, 840, 854, 858), and can also be downloaded for offline viewing at a later time. User profile data 816 such as the contents of MobileShop are also cached locally for faster response time and interaction in "offline" mode. Streaming video is also saved to local storage to allow future viewing or back-seeking to earlier moments in the stream. Further, the "MobileShop" player 802 supports all major multimedia formats, in non-interactive mode, while allowing interactivity to occur with the MDV format files. As a standard multimedia player it necessarily may support play/pause/seek, fast-forward, multiple speeds, window resizing, volume control, etc.

The media server 804 is a cloud-based platform for serving MDV content to the MobileShop player 802, managing user profile information (along with their MobileShop data) 816, and performing user behavior analytics across all MobileShop players and content. Matching the capabilities of the MobileShop player 802, the media server supports streaming content in real-time, or downloading for future viewing. One of ordinary skill in the an can envision that non-streaming content can be distributed over a Content Distribution Network (CDN) for lower latency and a smoother viewing experience. Similarly, MobileShop Cloud Server 804 can be embodied on a high-performance system or clustered across systems to improve performance and handle increased load.

User profiles 816 can be linked to other social media, such as FACEBOOK, GOOGLE+, LINKEDIN, etc. User behavior data is reported from individual MobileShop players 802 in real-time (e.g. when network conditions allow) or in batch format. User behavior analytics are processed in real-time as they are received, with batch processing occurring on a periodic basis for any data that cannot be processed in real-time.

The data flow process begins when the user launches the application 822 via the application controller 806. Next, the network adapter 812 sends a request to initiate a user session 824. The request router 814 then requests a user profile 826 which is returned from the user profile database 816 to complete the application launch request 822. The application launches the content browser 828 using the application controller 806, which allows the system to show the media summary 830 using the MDVM tag browser 808. This action is completed via the network adapter 812 to request media summary information 832 from the request router 814 via the MDVM tag database 818. When the user starts the multimedia player 834, again using the application controller 806, the multimedia player 810 allows the interaction to play media 836. The media play request 836 is then routed through the network adapter 812 to the request router 814 which reads the request for a media stream 838. The request 838 is then sent to the streaming media content 820 for a continuous multimedia stream 840. As indicated by multiple dashed response arrows, this continuous multimedia stream 840 is returned over time to the multimedia player 810 via the network adapter 812. At some point during the playback, there comes a need to render a MDVM tag 842 in the player 810. This results in a MDVM tag request 844 via the network 812 to the request router 814, which serves back the tag from the tag database 818. At some point the user interacts with the media 846 as identified by the application controller 806. The interaction includes executing a scripting event 848 within the multimedia player 810. The request router 814 receives a request originating from the scripting event 848 in the player 810 via the network adapter 812 to save user behavior data 850. This save event is recorded in the user profile database 816, which subsequently allows the system to calculate analytics 852 on that individual and/or related user groups.

Notably, the multimedia stream continues 854 to be served by the streaming data server 820 through all the series of actions beginning with original play media request 836 until the stream ends 858. The stream ending 858 triggers the application controller 806 to launch a tag (e.g. MobileShop) browser 860. The tag data is displayed 862 using the MDVM tag browser 808 and via the network 812 the request router 814 requests MDVM tag data 864 from the MDVM tag database 818 which is subsequently returned through the various control points (814, 812, 808) until the user interacts with the tags 866 as identified by the application controller 806. This interaction is identified by the MDVM tag browser 808 as tag navigation 868. Once again the network communication 812 occurs to invite the request router 814 to save the user behavior data 870. Once again, the user data is saved in the user profile database 816 and any resulting analytic calculations 878 are performed as necessary. At some point of interacting, the user decides to purchase products 872 as observed by the application controller 806. Again this updates the user profile 874 via the network 812 and request router 814 and manifested in the user profile database 816. At this point the application launches the order fulfillment application 876.

Figure 9:
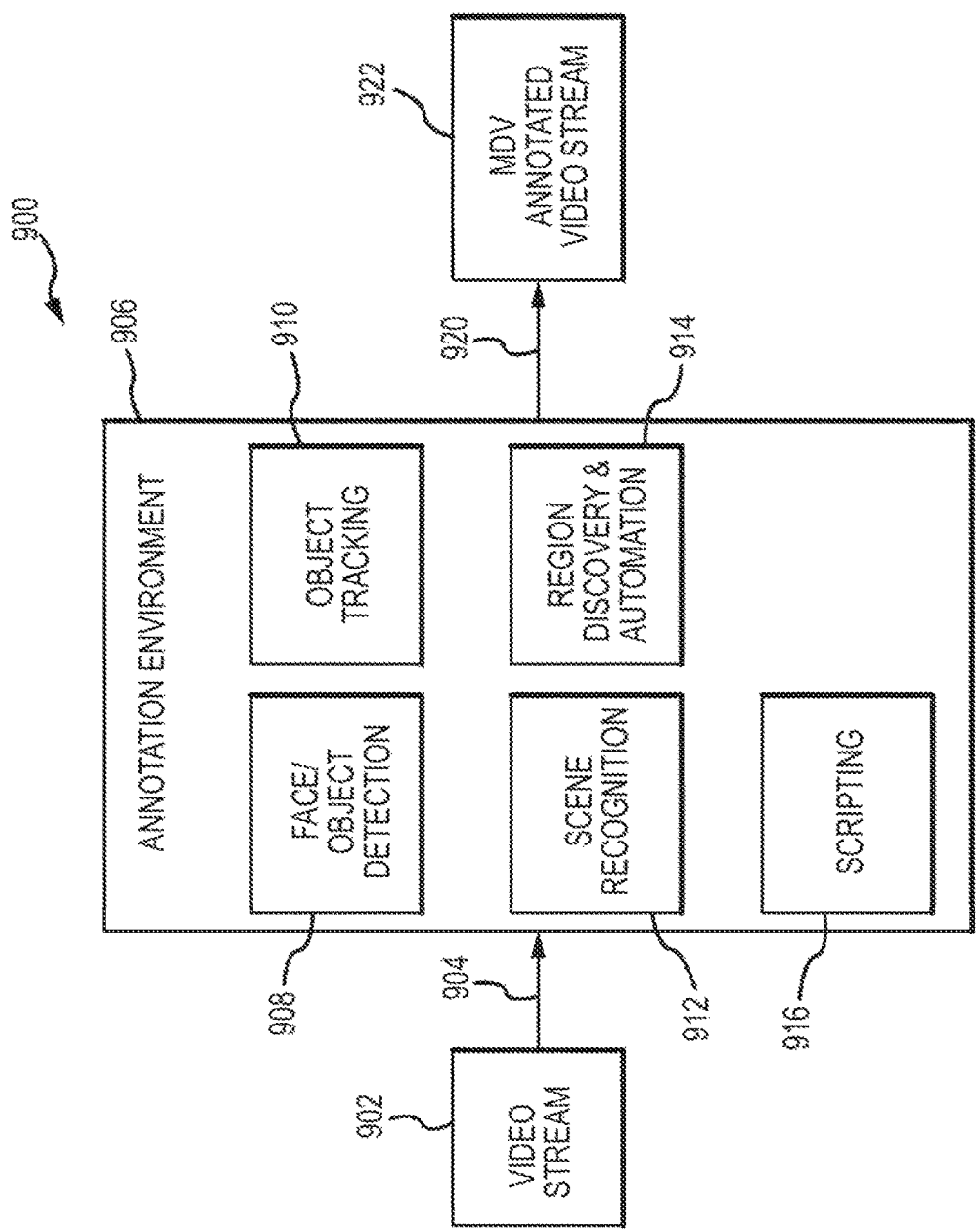
FIG. 9 is a data flow diagram of a simplified representation of an annotation process according to some examples of the present disclosure.

FIG. 9 is a data flow diagram 900 of a simplified representation of an example annotation process described herein. The original video stream 902 is made available to the annotation environment 906. The video stream 902 may be original content or repurposed video, where original content may be, e.g., coming directly from a video camera, and repurposed video may be, e.g., video that has been produced and recorded and perhaps made available in other (non-MDV) formats before MDV annotations are desired.

The video stream 902 is transferred to the annotation environment 906 using electronic communication 904 which may occur as embedded within a single hardware device, e.g. a camera, or may be through a direct wired connection to a specific hardware device or a general purpose computer, through an internet connection (wired or wireless) to a remote hardware device or general purpose computer. Whether embedded within a specific hardware device, or a general purpose computer, and whether local or remote to the video stream origin, the annotation environment 906 remains consistent. Furthermore, depending upon the capabilities of the system in which the annotation environment 906 is embedded, there may or may not be interaction capabilities such as those available with general purpose computing devices (e.g. video display 118, alphanumeric input device 120, or cursor control device 122), or may be physical buttons or knobs on a special purpose hardware device, or even the ability to use specific hardware sensors (e.g. temperature, radio frequency identifier tags, etc.).

The annotation environment 906 may include modules for annotating the video stream 902 with annotations as may be desired. The automation environment may include one or more modules embodying known or later developed machine learning, machine vision, and automation techniques. These techniques may be entirely automatic or may utilize a combination of automatic and manual actions. An example of a combined approach may be, e.g., an automated facial detection algorithm combined with a manual tagging of the name of the individual whose face is recognized. Example capabilities of the annotation environment include face and/or object detection 908, the ability to identify and/or recognize individual faces in the video, or similarly specific objects within the video (e.g. people, vehicles, animals, vegetation, furniture, mechanical devices, etc.). In addition, annotation environment 906 may include object tracking 910 to track the various objects as they may move from frame to frame, either via their own volition or via panning of the camera. Similarly, scene recognition 912 may operate similarly to object detection, but focus on specific holistic scenes, e.g. a living room, a production studio, a natural environment, etc. Region discovery and automation 914 may identify portions of the video that have particular interest, such as an area of focused movement in the video or otherwise are subject to change based upon object tracking 910 or other processes. The identified regions may be static (e.g. a fixed region on the video frame) or may be dynamic (e.g. changing size, shape, or location on the video frame). Annotation further allows scripting 916 to embed actions based upon the various annotated elements, and other related machine learning, machine vision, and other techniques. For example, a scripting module 916 may enable the selecting of an action to be performed responsive to user interaction with one or more regions from a library of available action, and associating the selected action with the scripting event and at least one metadata tag. The annotation environment 906X may be communicatively coupled with a data storage (e.g., a database) which may store metadata including definitions of tags, regions and/or scripting events. In some examples, the data storage may store the library of available actions.

In some examples, upon completion of an annotation process as described herein, the video data and annotations may be formatted into a file format in accordance with the examples of the present disclosure. That is, upon completion of annotation processing in the annotation environment 906, the video data is produced, now as a complete MDV annotated video stream 922. The annotated video stream 922 may be produced frame by frame as a streaming action 920, e.g. in real-time or with some delay, or may be produced as a complete video file. As such, the terms stream or file may be interchangeably used herein. The MDV annotated video stream 922 may be transferred 920 to a storage device (e.g. disk, tape, etc.) or may be viewed directly. In further examples, the annotations may be independently output in the form of an MDVM file as described herein, which file may be called at the time the video data is played back on a multimedia player according to the present disclosure.

Additional examples—Examples 1-14 below—are provided for ease in understanding applications of systems, apparatuses, methods, and computer program products described herein. These examples are not intended to be limiting as to their specific user scenario, and are not intended to reflect that these are the only examples of use cases for the technology described herein. Rather, they are provided to aid the user in appreciating aspects of some examples of the present disclosure.

Example 1—Direct Response Video

Shawn, like many people, likes to watch television in his spare time. As someone who keeps abreast of technology, Shawn often will watch television using a modern, an internet connected device (such as a ROKU brand player), his cellular telephone, APPLE IPAD, or his laptop computer, or any hosting appliance that supports continuously streaming video transmissions. Shawn has noticed that he has had different experiences with his different viewing devices, which he finds annoying. Commonly, when he watches his television he also uses his IPAD at the same time to browse and investigate products that are shown during commercials. For Shawn, this is a very disconnected experience—he would like to use a single device for his viewing rather than multiple devices.

Shawn has discovered that when he watches a certain video that once aired on television, now available via his mobile phone and computer devices, there is a new technology that allows him to interact with the multimedia content he is viewing. Interestingly, these interactions are more seamless with this video programming than the fully interrupted commercial experience he has experienced since his youth. With this new style of direct response video (e.g. using example file formats and/or readers described herein) available on his mobile and computer devices, rather than needing to respond by explicitly navigating to a web site or calling a toll free number, he is able to: (1) select products of interest from either prerecorded or streaming video productions, (2) contact the supplier of selected products without the use of any second device (e.g., telephone or via the internet), and (3) purchase such products through supplier order fulfillment processes. Note that an e-Commerce channel may be opened using techniques described herein without interrupting the video stream such as by introducing (1) pop-up windows, or (2) second (e.g., split) screens in order to open an e-commerce channel. Instead, Shawn may initiate an order by directly interacting with the streamed content.

As Shawn continues his exploration of new video formatted technology, he begins to notice that original studio programming of television programs and other video productions that are being aired on broadcast networks such as HGTV, the Food Channel, the Outdoor Channel, the Travel Channel, etc. are now available as "shoppable" video when viewed on his mobile and computer devices with the express purpose of opening a direct channel with the viewer to facilitate immediate purchase and order fulfillment of products and services (e.g., apparel, furniture, appliances, travel packages, etc.) featured in the video. Thus, Shawn can interact with and select products or services of interest and connect with the supplier of such products or services either during, or upon completion of, viewing the advertisement using his mobile and computer devices, or any hosting appliance with a suitably configured video player that supports continuously streaming video transmissions, with a simple click-through into and/or through the supplier's on-line order fulfillment website to be placed within a personal (e.g., sales lead specific) shopping cart on the supplier's e-commerce website in a seamless integration of MOBILEDIRECT shoppable video technology with the supplier's information technology infrastructure.

Shawn finds this experience quite enjoyable and looks forward to when he can use it with some of the three dimensional programming and movies that he has become accustomed to watch on his television and also with emerging technology such as the augmented reality GOOGLE GLASS that he has his eye on purchasing. Once Shawn is aware of these interactive functions, he actually notices it also works on his audio book and electronic book devices even when video channels are not available—with the audio and electronic books he is able to tap his device to indicate interest in a particular topic and have that topic remembered later so he can purchase it (e.g. reference to a previous book in the trilogy, or the particular brand of sunglasses described as used by the protagonist). He also notices that some of his selections produce a scripted advertisement to play instead of his standard audio or electronic book content.

Example 2—Brand Based Advertising

Shawn heavily uses his computer to browse internet World Wide Web (WWW or web) sites. Recently, while looking for new clothes, he discovers that his favorite brand BIGNTALL has a video of models demonstrating their various shins and pants. While watching the video, Shawn recognizes that the video is not only informative in explaining the clothing, it is interactive (e.g. using example file formats and/or players described herein). He is able to select a particular pair of pants he likes directly from the pair being modeled in the video, and add those pants to his shopping cart while still watching the video. Shawn is quite impressed and completes his order after watching the full video to determine if there are any other clothes that strike his fancy.

Later that day Shawn is surprised to discover, while researching a new truck he is interested in, that the Testa brand truck he is researching for the upcoming model features has an interactive video as well! Clearly this is a pre-release informational video about the new Testa electric truck, but Shawn is able to learn about the various features available simply by clicking on each of the parts of the truck that interest him during the video. At one point while the video is describing the exterior of the truck, Shawn selects the tires (which caught his eye but were not being described at the time). Shawn's selection of the tires provides him with detailed information about the tires, wheels, and also the four wheel drive system available on the truck. Following his interests and only casually paying attention to the background video presentation, Shawn continues to select various parts of the truck that interest him and learns about the service contracts, vehicle range and performance, available options, and many other things. While some of these features and services are covered in the video, others are not directly described and only available to those curious enough to discover them through their interactions (such as Shawn's investigation of the head and leg room for someone his height). Shawn's experience is very positive with the new Testa truck and the complete and coherent multimedia presentation of every question he had, so he proceeds to place a reservation for the yet to be released vehicle.

Shawn's interaction on the Testa site connects him with the supplier's on-line order fulfillment website to be placed within a personal (e.g., sales lead specific) shopping cart on the supplier's e-commerce website in a seamless integration of MOBILEDIRECT shoppable video technology with the supplier's information technology infrastructure.

Example 3—Repurposed Video for Purchases

Andrew is a television marking executive who works with many different video producers and product brand representatives. Andrew has noticed that the few emerging direct response video advertisements and test-runs of television programming released for viewing on mobile and computer devices have produced a great return on their investment. However, Andrew is a very pragmatic person. He wants to provide more direct response interactive video experiences, but would rather not produce content explicitly for this purpose since he has so much standard content already available to him. Andrew discovers that with the appropriate transcoding tools, he is able to convert existing libraries of standard format video content into interactive MDV formatted content with little effort (e.g. using file formats and/or converters described herein). All Andrew's team needs to do is run the video format conversion tool, then manually annotate or select a set of automated algorithms to annotate the relevant portions of the video for sales or informational purposes. The MDV format described herein allows the insertion of the metadata track into the original audio and video tracks which provides the interactive capabilities Andrew desires. These repurposed, existing video productions such as music videos and television programming that has been broadcast on networks such as HGTV, the Food Channel, the Outdoor Channel, the Travel Channel, etc. now extend audience reach beyond initial network broadcast and intersect consumers via the internet when such programming is delivered over desktop and mobile devices, or any hosting appliance with a suitably configured video player that supports continuously streaming video transmissions, with the express purpose of opening a direct channel with the viewer to facilitate immediate purchase and order fulfillment of products and services (e.g., apparel, furniture, appliances, travel packages, etc.) as featured in the video. Also, he is able to convert a home remodeling television show to provide interactions which connect the viewer with the particular home products used on the program.

Andrew and his team gain such a positive response to their repurposed video content that they begin also doing the work for brands that are using non-television channels to reach their consumers. He and his team commonly work with repurposed video used by the brand elsewhere, such as for their online presence or via in-store kiosks. When a brand approaches Andrew for direct response advertising, he suggests new interactive videos. One of Andrew's clients is a department store with a very personalized shopping experience. This department store provides their in-store customers with some interactive videos to indicate their preferences for styles and choices and then provides a personal sales representative to guide them through the store to those items of interest.

Example 4—Movie Productions and Trailers

Andrew recognizes the value for the interactivity for the video content he produces could extend well beyond the repurposed video he normally produces. He determines it is very little effort to convert portions of a DISNEY movie (e.g., a trailer) which is about to air on his network to provide an interactive experience (e.g. using file formats, converter tools, and/or players described herein) and is able to connect viewers directly to a relevant DISNEY merchandise store. He foresees the value to enhancing any Hollywood movie trailer with shoppable elements. Not only can he embed movie ticket purchase elements, he is also able to work with brands to capitalize even further on their particular product placements in the trailers to channel consumers directly to the various brands from the movie trailer. Now, with Andrew's help, every movie trailer accessible over the internet or mobile device, or any hosting appliance with a suitably configured video player that supports continuously streaming video transmissions, can drive additional direct revenue, allowing the movie production houses and product placement advertisers more direct tracking about their advertising investments.

Once Andrew releases several movie trailers, he realizes he has been thinking too small. Movie productions "reformatted for television release" or otherwise accessible via movies streaming services such as NETFLIX or AMAZON PRIME are equally easy to render shoppable via interaction with consumers with the express purpose of opening a direct channel with sponsors of products/services featured within the video (e.g., apparel, toys, games, etc.) to facilitate immediate purchase and order fulfillment of items selected. In fact, Andrew gains quite a bit of traction and business from AMAZON to enhance their movies with interactive product links back to the content offered for sale on Amazon's shopping site.

Example 5—Personal Life Video Tagging

Shawn has become quite interested in the interactive television experience he has recently discovered. He does some research and learns that by using the same method to tag the video with shopping items, it is possible to tag personal videos. In this case, Shawn can load his video into a toolkit provided by MOBILEDIRECT (e.g. annotation or other systems described herein). This toolkit allows Shawn to "select" items within the video and "tag" the video with information. As is, the MOBILEDIRECT application leads Shawn to a list of shoppable items. However, Shawn is less interested in providing a shopping experience for his friends and family, so he discovers how to use the MOBILEDIRECT tool to create a list of tagged items in the video. Once Shawn tags the content of his video to his satisfaction, his family and friends can choose to share the video, the tag, or any other information within the list.

Once Shawn is comfortable with his new MOBILEDIRECT tool, he decides to document his next outdoor trip. Upon arriving to the staging ground, Shawn begins filming the experience. Once the trip is over, he uploads the video to the MOBILEDIRECT toolkit. Here he begins tagging the experience. During the tagging phase, Shawn elects to tag a wild deer. He inserts data about the location, time of day, and weather. When complete, he submits the tag to the video. The video continues and Shawn begins to tag another spot in the video. This time, he tags the video with information about a story. Shawn types in that he saw a squirrel chase an owl and submits the tag to the video. Towards the end of the video, Shawn decides that others may enjoy the experience in a similar way. He decides to tag everything in their equipment kit and provide a hyperlink to the site in which the viewers can buy similar equipment to what he used. Shawn submits this tag to the video as well.

Once complete, the MOBILEDIRECT toolkit takes Shawn to a list of items that were tagged in the video. Shawn decides to share these items with different social media contacts based on what he believes will interest them. In one case he shares the squirrel tag with contacts that he knows want to see humor in nature, but chooses to share the equipment tag to a group of outdoor enthusiasts that want to have similar experiences, and finally he shares the deer tag to all of his contacts. After this process is finished, Shawn uploads the video to the MOBILEDIRECT cloud where all of his friends receive notification of a shared item as well as having the video published at Shawn's discretion. Having the ability to publish the video discretely allows Shawn to share his life with everyone or a sub-list of contacts in his directory.

Example 6—Commoditizing the Consumer

MOBILEDIRECT has received authorization from Shawn to tag his outdoor equipment with the proper vendor of that equipment. MOBILEDIRECT then uses the video and all of the shares as marketing information available to the vendors of the outdoor equipment. The data collected from each view of and each interaction with the video makes it easy for the vendors to understand that the video has increased their footprint for advertising. MOBILEDIRECT successfully delivers a comprehensive set of reports based on the data that has been generated from the views. Also, Shawn receives incentives (e.g. discounts, free product, or official payment) from the vendors based on points earned for their shared video.

Example 7—Educational Experience

Eric is a teacher who uses the MOBILEDIRECT toolkit (e.g. systems and/or annotation tools described herein) to tag a video that will be used in a testing situation. Eric moves through the video, tagging elements within the video that each student must tap accurately to get credit. The teacher then loads the video (which may, for example, use a file format described herein) into the MOBILEDIRECT cloud where only that specific classroom can access the video. Students then view the video on the school's provided iPads and begin their exam. Since MOBILEDIRECT can track which user interaction occurred first, the final result is a comprehensive report based on each student's interaction with the video. Eric can track and see which students touched which items during the video and further refine each student's learning. Specifically, Eric tagged a video with animals in it. In the video, Eric has tagged animals from different families. Students must correctly identify the family of animals to which each belongs. Eric then uploads the video to the MOBILEDIRECT cloud. A student takes the exam on their provided IPAD. The student is asked to correctly identify the animal in the video that belongs to the Canidae family. The student correctly touches a dog in the video. Another scene has birds and the student is asked to identify the family that the bird belongs to. The student incorrectly selects the family Archaea. After the video, the student has direct feedback given due to Eric hyperlinking the correct answers to the appropriate Wiki page. At the end of the test, Eric reviews the results given as a list from the report generated by the MOBILEDIRECT analytic. Eric quickly assesses the student's work and determines the grade.

Example 8—Without Commercial Interruption

Andrew has taken his understanding of interactive video to the next level. He realized that traditional television commercials disrupt the flow of any presentation. He sometimes has advertisers purchase blocks of time or sponsor movies to reduce the amount of interruptions. But now with the interactive video options supported by MOBILEDIRECT shoppable video technology (e.g. using file formats, annotation tools, and/or players described herein) he realizes that he can do much more. He envisions having programming that does not interrupt viewing periodically to insert messages of any nature from sponsors of such productions, but rather allows audience interactions with a continuously streaming transmission to "integrate" and present all sponsor messaging completely within the video, thereby allowing customers that opt in for sponsor messaging when interacting with the video to bookmark "points of interest" with the express result of opening a direct channel between sponsor and viewer to facilitate follow-on purchase and order fulfillment of products/services offered by the sponsor.

Andrew tries this with a short 30 minute film on fly fishing that can be viewed via a suitably configured video player installed on desktop and mobile devices or on any hosting appliance that supports continuously streaming video transmissions where individual sponsors can have their logos appear briefly whenever the viewer interacts with tagged images within the programming (e.g., a trophy Rainbow Trout or a trophy Brown Trout) with the express result of aggregating viewer/sponsor points of contact each linked to facilitate follow-on purchase and order fulfillment of fly fishing products/services offered by the sponsor (e.g., a special introductory price promotion on a fly fishing reel offered by one sponsor in association with the Rainbow Trout, and a second promotion on a fly fishing rod offered by another sponsor in association with the Brown Trout). Andrew's use of MOBILEDIRECT technology will result in a specific sales lead channeled via the internet either to the sponsor's/supplier's on-line order fulfillment website, or directly into a personal (e.g., sales lead specific) shopping cart on such website in a seamless e-commerce integration of MOBILEDIRECT shoppable video technology with the sponsor's/supplier's information technology infrastructure.

Andrew realizes through the success of the fly fishing test video that by extension, this approach will work with any film, video feature, or television programming of any nature developed: (1) to highlight such activities as travel, home remodeling, food/recipe preparation, dining, hunting, reality scripting, etc. and/or, (2) to entertain, educate, document, or in any way inform viewers in a manner where unobtrusive sponsor messaging is similarly integrated and tagged within such programming inviting viewers to opt in for such messaging and open a direct channel between sponsor and viewer to facilitate follow-on engagements between the parties whether for the purchase and order fulfillment of products/services offered by the sponsor or otherwise.

Example 9—Live Streaming

Rob is organizing a technology conference. One aspect of the conference is that there will be a number of remote users who need access to a live streaming video of the presentations and technology demonstrations. To accomplish this live stream event, Rob links up a video camera, in this case a webcam, but he notices it would also work with a screen capture device, Google Glass, hand-held video camera, or camera embedded in mobile phone. Rob uses the video camera to stream data in MDV format (e.g. a file format described herein). During the conference, Rob, other conference organizers, and sometimes even conference attendees "insert" MDV Tags into the live stream in real-time, by: (a) entering tag information manually using a keyboard input device, (b) accessing the "tag this stream" function in their device or mobile app, and selecting from a local database of tags, (c) using voice commands on devices that support voice input to insert tags, or (d) running MDV Tagging software somewhere "downstream" from the original streamer. For example, a video editor uses tagging software to tag the stream before broadcasting it for remote attendees (e.g. using an annotation tool or other system described herein).

Rob is intrigued that the live stream software can also be sensitive to hardware-driven events. He enables this feature to interact with the radio frequency identification chips embedded within each conference attendee's badge so that when a radio-based RFID tag comes within range of the streaming device, the RFID tag is linked to an MDV tag to describe the speaker. Last minute attendees don't have the RFID embedded attendee badges, but their badges are printed with an appropriate QR code. These speakers only need to show their QR code to the camera and the QR code is linked to an MDV tag.

If Rob had a smaller event he could have taken a picture of each attendee upon arrival, and then used the facial recognition capabilities of the system. With facial recognition capabilities, when a human face comes within frame, the system can run face recognition software on the face and then download an MDV Tag for that particular person.

When an MDV tag is inserted into a live stream, the video player for the remote conference attendees can respond in a number of ways. For example, if a user clicks/taps anywhere in the frame, that tag can be "captured" just as if it were a pre-recorded MDV interactive video. Also, a tag content thumbnail can appear in a "gutter" along the side or bottom of the original video. Then, a remote attendee can "capture" the tag by selecting the thumbnail.

Example 10—Movie Theaters, Concerts, and Other Live Venues

While attending the latest superhero movie release in his local movie theater, Shawn discovers that MDV Tags can be accessed via his mobile phone device. An application on the device is synchronized with the live event, and available tags are displayed on the mobile device. During the movie Shawn is able to see (and select) products shown on screen at the time, and also get additional information such as director's comments or interesting trivia relevant to the scene.

Later that week, Shawn attends a large music concert with multiple bands playing simultaneously. Shawn is able to use the MDV application on his mobile phone (e.g. an example player described herein) to get lyrics of the current song that is playing displayed on his cell phone via a synchronized MDV live stream tag of the current band he is listening to. One band takes this effect a bit further and has their acclaimed music video synchronized to their live performance and displayed via Shawn's mobile phone. During breaks between songs, Shawn is able to see a live-stream video of the performers on stage and to select their t-shirts to purchase the band's logo wear, and pick it up later at the merchandise table.

Example 11—Audio-Only Media Streaming (Audio Books, Music, Live News, Etc.)

When Shawn recognized the interactive capabilities within his audio books and electronic books, he began looking for other devices with this capability. He figured out that there were many devices now available that had interactive capabilities like he has on his mobile appliance for video streaming, except in applications where there is no video and thus there is no concept of "within the video frame" for his interactions. In these non-video devices, whenever an MDV tag is detected, that tag information is displayed on the mobile device's touch screen, and the user can "capture" that tag there. Shawn found this to work for audio (e.g. music) players, where an MDV-aware audio player displays tag content whenever it appears in the stream, and Shawn interacts with those tags just like in a video application.

Example 12—Live "Multi-Stream Reality TV"

Andrew's emerging interactive video network is introducing a new "reality programming" show. With Andrew's input, the show equips every contestant with their own camera, and audiences can "follow" whichever contestant is their favorite. Any time another contestant appears in screen (or is within close proximity, as detected by RFID or DPS technology), the "statistics tag" for that contestant shows up in the stream (e.g. through operation of a scripting event described herein). The viewer can capture that contestant's info, or can switch context to follow the new contestant, in an instant.

The MDV format and user behavior tracking also allows an alternate approach to similar known technology allowing the viewers to vote on content and activities within the television show. For the talent contest portion of the reality television show presented over the MDV stream, each viewer can vote for their favorite performer using their desktop or mobile devices, or any hosting appliance with a suitably configured video player that supports continuously streaming video transmissions. With the interactive nature of the MDV system they can "bookmark" performances they like and then at the end of all performances vote for their favorite from among their bookmarks. Similarly, after the talent contest when the adventure portion of the interactive reality video show occurs, the viewer can provide input on whether to make camp next to the river, or up on the hill, as determined by an MDV tag poll of the audience.

Andrew realizes it may even be possible for several different reality television shows happening at the same time to intersect with each other, with the cast from one show interacting with people from the cast of another show, as well as the audience, and proposes this new concept to his network. The MDV system's ability to scope content and tags to specific audiences and to track individual users provides a level of flexibility for presenting voting and interaction that was previously unavailable to Andrew.

Example 13—Media Focus Group Testing

Andrew has become the "go to" video marketing guru when assisting many different video producers and product brand representatives with their productions of interactive video. Over time, he has been able to assist his clients with improving the quality of their advertisements. As original video content is being edited down to a final interactive shoppable release, he leverages the MOBILEDIRECT shoppable video technology (e.g. annotation tools, file formats, and/or players described herein) to test for and isolate "hot spots" in the video content that invite viewer interaction. Together with his clients, he assembles virtual focus groups (e.g., participants not assembled in-studio, but remotely located with access to the web) that review online early versions of original video content intended for conversion into the MOBILEDIRECT Video File Format. Feedback from these reviewers reveals locations within the content where viewers are most likely to desire interaction with the video.

Over time, Andrew also has discovered that he can identify the type(s) of emotional responses (e.g., humor, happiness, excitement, jealousy & envy, empathy, etc.) and technical production details (e.g., camera angle, lighting, length of video, music & audio prompts, storyline, context elements, etc.) that are best leveraged within the content of various interactive advertisements to effectively invite and engage viewer interaction leading to order fulfillment of products/services promoted within the content. This understanding avoids the general hit-and-miss approach he once witnessed where video advertisements sometimes miss the mark and have to be scripted, shot and produced over again. In addition, the assembly of appropriate focus groups online versus in-studio delivers both flexibility and cost savings. As a result, the final direct response video advertisements released today by Andrew's clients generally cost less to produce and deliver higher returns on investment than ads associated with earlier experiences.

Example 14—Demonstration Videos for Multi-Level Marketing (MLM)

Misti sells MARY KAY cosmetics. She has found that many of her clients appreciate her makeover styling and ask her for tips, suggestions, and pointers about her technique and the particular cosmetics she uses. Misti recognizes that if she produced a video of a makeover she could explain that process once but then distribute it to all her clients. She further recognizes that the demonstration video of the makeover provides her clients with more opportunities to purchase cosmetics through her.

Misti discovers the ability to embed MDV tags inside of a demonstration video (e.g. using annotation tools and/or file formats described herein) that allow her to link each product in her demonstration to an item she has for sale, and her clients can view the video in an MDV capable video player (e.g. example players described herein) and directly select each cosmetic product as it is demonstrated or referenced.

Misti's customers' selections are then added to their shopping cart to be ordered and credited to Misti's sales account.

Misti's supervisor Rhonda recognizes that Misti's recent success can be attributed to the demonstration video with direct links to product purchases. Rhonda discovers that, with Misti's permission, she is able to reuse the demonstration video but use MDV tagging and editing tools to quickly repurpose the specific purchase identifier tags for the various products so that other direct sales agents can use the same video but get credit to their sales accounts instead of Misti's. In fact, Rhonda discovers that, with the use of MDV tagging and editing tools, she is able to easily update product links as product availability changes, as well as easily customizing the sales agent who receives credit for the purchase. Using the MDV editing suite Rhonda can thus manage inventory and sales agents without producing a new demonstration video for each change, saving MARY KAY resources but yet boosting sales volumes.

Rhonda begins to also realize that the demonstration videos could play a secondary role as well. Rhonda is aware of some emerging MARY KAY partnerships with clothing lines which complement particular cosmetics. Rhonda uses this new partnership knowledge to begin producing specific demonstration videos for emerging cosmetics as instructional information for her sales agents and their clients, and at the same time use the video to introduce specific partner products into the interactive video. Now customers may select for purchase or information not just the cosmetics, but also the clothing offered by a business partner.

The examples provided above are not intended to be an exhaustive explanation of each possible operation of the systems and methods described herein, and the various embodiments are not limited to any example described above.

Although an overview of the inventive subject matter has been described with reference to specific example embodiments, various modifications and changes may be made to these embodiments without departing from the broader spirit and scope of inventive subject matter. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the application shall cover all such modifications and applications that do not depart from the spirit and scope of the inventive subject matter as currently or later claimed.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for providing interactive content, the method comprising:
　receiving content data comprising video data;
　receiving an indication of a region within a frame of the content data;
　receiving a scripting event associated with the region, wherein the scripting event specifies an action to be taken responsive to a trigger;
　receiving a metadata tag or a reference to the metadata tag, the metadata tag associated with the region; and
　formatting at least a portion of the content data, the indication of the region, the scripting event, and the metadata tag or the reference to the metadata tag in accordance with a file format for transmission, including encoding a video data block and a metadata block associated with the frame into a digital container, wherein the digital container comprises:
　a plurality of information tracks including a first track comprising the video data block and a second track comprising the metadata block, the metadata block comprising the metadata tag or the reference to the metadata tag and a definition of an action to be performed responsive to execution of the scripting event; and
　keyframe header data, video frame difference data blocks and metadata frame difference blocks associated with respective ones of the video frame difference data blocks.

2. The method of claim 1, wherein the trigger comprises a system event or a user interaction with the region.

3. The method of claim 1, wherein the digital container further comprises one or more additional tracks comprising audio data, the method further comprising formatting at least a portion of the audio data in accordance with the file format.

4. The method of claim 1, further comprising;
　encrypting at least a portion of the metadata block prior to encoding the metadata block into the digital container.

5. The method of claim 4, wherein the frame is one of a plurality of frames, the method further comprising formatting a plurality of data blocks associated with the plurality of frames and associated metadata into a stream container for transmission in the form of streamed video.

6. The method of claim 4, wherein the region corresponds to a three dimensional object in the frame, and wherein the receiving an indication of a region within a frame comprises automatically detecting the object within the frame.

7. The method of claim 4, wherein the trigger comprises a system event or a user interaction with the region.

8. A system for providing interactive content, the system comprising: a processor; wherein the processor is communicatively coupled to a data storage comprising a plurality of tags and a plurality of scripting events, and a memory having instructions, which when executed by the processor, cause the system to: receive content data comprising video data; receive an indication of a region within a frame of the content data, associate a scripting event with the region, wherein the scripting event specifies an action to be taken responsive to a trigger; associate a metadata tag with the region; receive an indication of a selection of one or more tags from the plurality of tags in the data storage; receive an indication of a selection of one or more scripting events from the plurality of scripting events in the data storage; associate the one or more scripting events with the one or more tags and the region within the frame; and format at least, a portion of the content, data, the indication of the region, the scripting event, and the metadata tag in accordance with a file format for transmission including encode a video data block and a metadata block associated with the frame into a digital container, wherein the digital container comprises: a plurality of information tracks including a first track comprising the video data block and a second track comprising the metadata block, the metadata block comprising the metadata tag or the reference to the metadata tag and a definition of an action to be performed responsive to execution of the scripting event; and keyframe header data, video frame difference data blocks and metadata frame difference blocks associated with respective ones of the video frame difference data blocks.

9. The system of claim 8, wherein the trigger comprises a system event or a user interaction with the region.

10. The system of claim 8, wherein the digital container further comprises one or more additional tracks comprising audio data, the method further comprising formatting at least a portion of the audio data in accordance with the file format.

* * * * *